(12) United States Patent
Laroia et al.

(10) Patent No.: US 7,453,912 B2
(45) Date of Patent: Nov. 18, 2008

(54) METHODS AND APPARATUS FOR SELECTING BETWEEN MULTIPLE CARRIERS BASED ON SIGNAL ENERGY MEASUREMENTS

(75) Inventors: Rajiv Laroia, Basking Ridge, NJ (US); Junyi Li, Somerset, NJ (US); Frank A. Lane, Asbury, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 806 days.

(21) Appl. No.: 10/964,946

(22) Filed: Oct. 14, 2004

(65) Prior Publication Data

US 2005/0233746 A1   Oct. 20, 2005

Related U.S. Application Data

(63) Continuation-in-part of application No. 10/872,674, filed on Jun. 21, 2004.

(60) Provisional application No. 60/562,900, filed on Apr. 15, 2004.

(51) Int. Cl.
*H04J 3/12* (2006.01)
(52) U.S. Cl. .................. 370/526; 370/491; 370/330; 370/331
(58) Field of Classification Search .............. 370/526, 370/491, 336–348, 480, 496, 525, 437, 329, 370/330, 331, 332, 333, 334, 335
See application file for complete search history.

(56) References Cited

U.S. PATENT DOCUMENTS

| 5,507,010 | A | 4/1996 | Ahonen |
| 5,896,562 | A | 4/1999 | Heinonen |
| 5,915,212 | A | 6/1999 | Pzelomiec |
| 6,216,012 | B1 | 4/2001 | Jensen |
| 6,272,313 | B1 | 8/2001 | Arsenault et al. |

(Continued)

OTHER PUBLICATIONS

International Search and The Written Opinion of the International Searching Authority for PCT/US2004/34226. dated Oct. 4, 2005, pp. 8.

*Primary Examiner*—Edward Urban
*Assistant Examiner*—Christian A Hannon
(74) *Attorney, Agent, or Firm*—Kenneth K Vu; Jeffrey D. Jacobs; Thomas R. Rouse

(57) ABSTRACT

Carrier frequency selection and handoff initiation methods in wireless communications systems employing multiple carrier frequencies are described. Although the receiver is tuned to a single band, based on the relative energy of one or more beacon signal components corresponding to the currently used carrier and one or more beacon signal components corresponding to an alternative carrier, a carrier selection and a handoff determination is made. Mobile nodes can use a single RF chain with a controllable RF filter to receive and process a signal within a first selected carrier band including components from different transmitters, e.g., a first signal component identified with the first currently selected band and a second signal component identified with a second alternative band. The signal components, e.g., beacon signal components from different transmitters may be obtained from a signal which corresponds to multiple symbol transmission time periods. Separate signal energy measurements are performed on the first and second signal components. The signal component energy is compared, and a determination is made as to whether a handoff should be initiated.

45 Claims, 18 Drawing Sheets

U.S. PATENT DOCUMENTS

| | | |
|---|---|---|
| 6,292,508 B1 * | 9/2001 | Hong et al. .......... 375/134 |
| 6,347,234 B1 | 2/2002 | Scherzer |
| 2002/0037742 A1 | 3/2002 | Enderlein et al. |
| 2002/0094785 A1 | 7/2002 | Deats |
| 2004/0203567 A1 | 10/2004 | Berger |
| 2005/0085265 A1 | 4/2005 | Laroia et al. |
| 2005/0124345 A1 | 6/2005 | Laroia et al. |

* cited by examiner

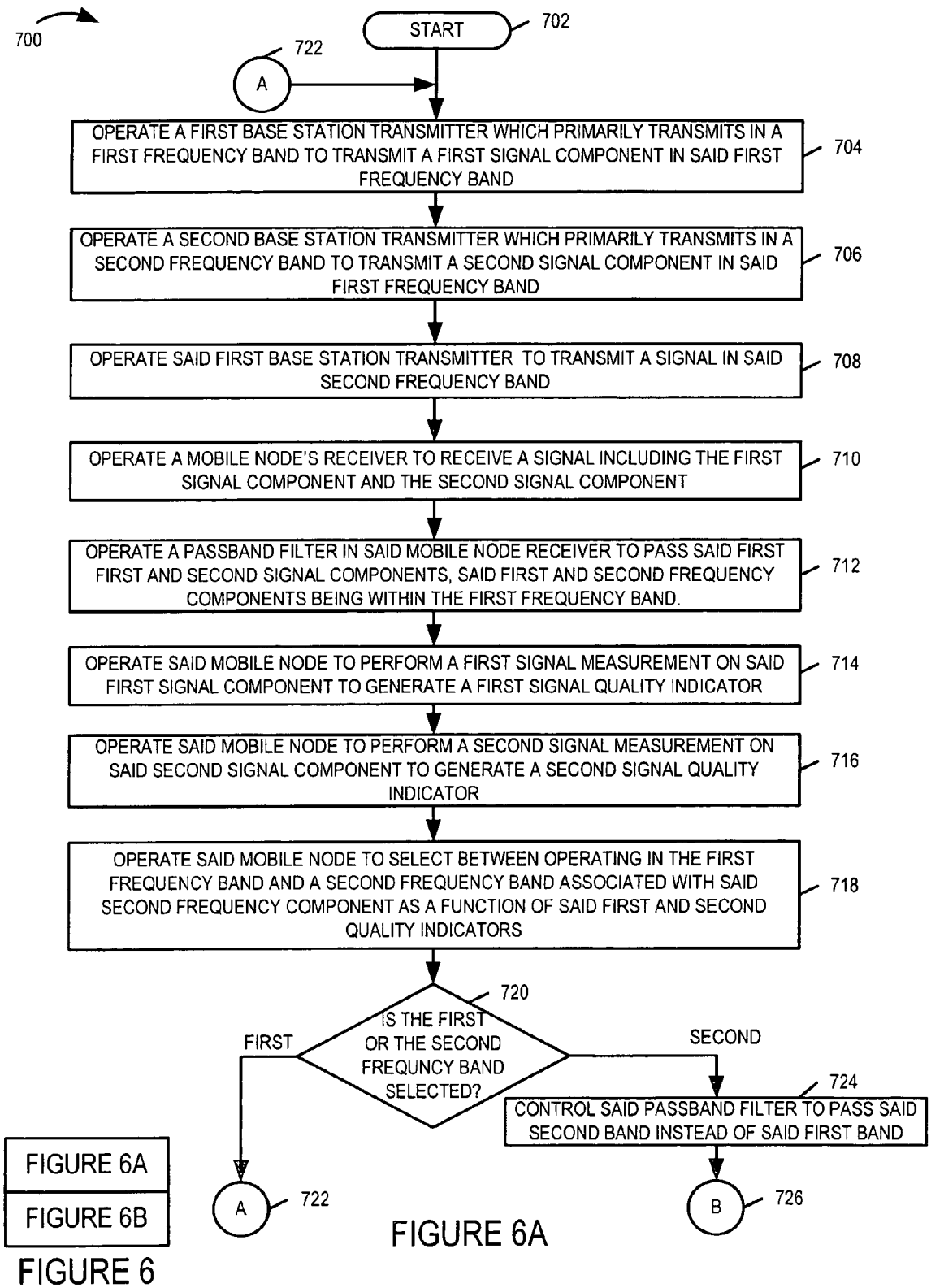

METHODS AND APPARATUS FOR SELECTING BETWEEN MULTIPLE CARRIERS BASED ON SIGNAL ENERGY MEASUREMENTS

RELATED APPLICATIONS

The present application claims the benefit of U.S. Provisional Patent Application Ser. No. 60/562,900, filed Apr. 15, 2004 which is hereby expressly incorporated by reference and is a continuation in part of U.S. patent application Ser. No. 10/872,674 filed on Jun. 21, 2004.

FIELD OF THE INVENTION

The present invention relates to communications systems and, more particularly, to the present invention is directed to methods and apparatus for determining the availability of carriers, selecting carriers and/or determining when to initiate a handoff from one network attachment point associated, e.g., associated with one carrier, to another network attachment point, e.g., associated with another carrier.

BACKGROUND

From an implementation perspective, it may be beneficial to use different carriers in different portions of a communications system, e.g., because rights to different frequencies are owned in different geographic locations and/or because it is desirable to minimize signal interference through the use of different carriers. Spread spectrum wireless communications systems may use different carriers throughout a system, with each carrier being associated a different frequency band. In some wireless communications systems, different cells and/ or sectors use different carriers. In some systems, the same sector or same cell uses different carriers each with an associated frequency band, e.g., where the total available bandwidth in a cell or sector is partitioned into different frequency bands, e.g., distinct frequency bands.

Wireless terminals (WTs), e.g., mobile nodes, may travel throughout the communications system and establish a connection with a given sector/cell base station using a particular carrier frequency and associated band, e.g., for downlink signaling. As conditions vary, e.g., due to a change in loading conditions, e.g., more users, on the carrier frequency, due to changes in levels of interference, or due to the WT moving, e.g., approaching a cell/sector boundary, it may be advantageous or necessary for the WT to transfer to a different carrier and attach to a different cell/sector/carrier frequency combination corresponding to a base station transmitter. Typically, in known systems, many wireless terminal receiver implementations use a single receiver chain and the wireless terminal remains on the same carrier until forced to switch, e.g., by a disruption in communications with the base station. This approach is undesirable since the WT experiences breaks in communications at boundaries and experiences changes in reception quality, e.g., fading, as the WT moves throughout the system. Other known receiver implementations use a single receiver chain, where the receiver interrupts communications with the connected base station transmitter and switches from the carrier in use, temporarily, to search and evaluate alternative potential carriers. This approach is undesirable since the WT disrupts normal communication sessions during the search intervals, expends time retuning the filter, e.g., RF filter, to adjust for each search frequency, expends time to wait for a detected carrier, collect and evaluate any received signals, e.g., pilot signals, and then expends time to re-tune to the original carrier setting.

In light of the above discussion, it is apparent that there is a need for improved methods and apparatus directed to efficient wireless terminal receiver design and operation. It would be beneficial if such apparatus and methods allowed for estimating the quality of two alternative channels using different carrier frequency bands at the same time without disrupting a communications session in progress. It would also be advantageous if such methods provided for continuous tracking of alternative carriers, allowing for wireless terminal selection of the carrier frequency/cell/sector base station attachment point, allowing for switching before disruptions in communications, allowing for the switching to occur at a convenient point, and allowing for switching in response to other considerations, e.g., system load conditions.

SUMMARY

The present invention is directed to methods and apparatus for determining the availability of carriers, selecting carriers and/or determining when to initiate a handoff from one network attachment point associated, e.g., associated with one carrier, to another attachment point, e.g., associated with another carrier. Each carrier corresponds to a particular carrier frequency and to a base station network attachment point which can be used by a wireless terminal to attach to a communications network via a wireless communication link. The attachment point may be, e.g., a base station, a sector of a base station, or a communications module within a base station sector, e.g., in the cases where multiple carriers are used in a sector, that is used to generate and/or process signals corresponding to the particular carrier frequency used by the network attachment point.

The methods and apparatus of the present invention can be used in wireless communications systems, e.g., spread spectrum OFDM and/or CDMA systems, using multiple carriers in the system, e.g., where the total available bandwidth is divided into different frequency bands, each band with an associated carrier frequency. Different cells in the system may use different carrier frequencies; different sectors of the same cell may use different carrier frequencies. In some embodiments, the same sector of a cell may use different carrier frequencies, e.g., at different power levels, providing additional diversity and additional base station connection alternatives, e.g., alternative attachment points for downlink traffic channel signaling.

The invention allows a wireless terminal's receiver to remain on its current operating carrier frequency band, and still receive information from adjacent sector and/or cell base station transmitters which can be used to identify the carrier used by the neighboring sector or cell and determine when a switch to a different carrier should be made.

In a system using the invention, base station transmitters in different sectors and/or cells periodically transmit a high power signal, sometimes called a beacon signal, into the frequency band used in the neighboring sector or cell. Beacon signals are signals which include one or more narrow (in terms of frequency) signal components, e.g., signal tones, which are transmitted at relatively high power compared to other signals such as user data signals. In some embodiments beacon signals each include one or more signal components where each signal component corresponds to a different tone. A beacon signal component in some embodiments includes a per tone signal energy which is 10, 20, 30 or more times the average per tone signal energy of signal tones used to transmit user data and/or non-beacon control signals.

Multiple beacons, e.g., multiple high power tones can be transmitted at the same time although in many embodiments at most a single beacon signal is transmitted by a transmitter in any given transmission time period, e.g., symbol transmission period. The single beacon signal may include a single high power signal tone or, in some embodiments, a few high power tones.

Each beacon signal component is transmitted e.g., at a predetermined frequency thereby allowing the frequency of the beacon signal components to be used in convey information, e.g., cell, sector and/or carrier information. In some embodiments, the beacon signal corresponds to a single tone. Beacon signal components may be fixed in terms of frequency or they can be transmitted at different points in time at different frequencies, e.g., according to a predetermined pattern such as a particular hopping sequence corresponding to a cell or sector.

In accordance with the present invention wireless terminals, e.g., mobile nodes, detect beacon signal components transmitted by different network points of attachment into the frequency band being used, e.g., monitored, by the mobile node. The relatively high power level of beacon signal components makes them easy to detect using energy detection methods that do not require symbol timing synchronization with the transmitting base station. The frequency of a detected beacon signal component, which is the frequency of the beacon signal itself in the case of a single tone beacon signal, is then determined by the wireless terminal, e.g., by determining the frequency at which the energy of a detected beacon signal component is concentrated. The detection of the beacon component frequency can, and in many cases often does occur, before the wireless terminal has determined the carrier frequency or symbol timing, related to the cell or sector transmitting the beacon signal. The frequencies of received beacon signal components can, and in various embodiments are, used to determine the sector or cell from which the detected beacon signal components were transmitted and/or the carrier frequency associated with the transmitting sector or cell. By storing information about received beacon component signal strength, e.g., power, and comparing the strength of beacon signal components corresponding to different network points of attachment, a mobile can select a carrier frequency to be used and/or determine when a handoff should be performed. The carrier frequency to which the handoff is to be made can be determined from the frequency (sometimes considered in combination with other information) of the received beacon signal component which triggered the handoff operation. In many cases the carrier frequency of the neighboring sector or cell is determined from stored information indicating the carrier frequency used by different sectors and/or cells to transmit beacon signals.

The information obtained from beacon signal components transmitted by neighboring sectors or cells, into the frequency band of the adjacent sector or cell, allows wireless terminals in the adjacent sector or cell to identify when a boundary region is being approached, when the wireless terminal should perform a hand-off, and what new carrier frequency should be used following the handoff. This can be accomplished without having the wireless terminal switch its receiver to a different frequency band in an attempt to identify the carrier of the neighboring sector and/or cell.

In one particular exemplary embodiment, multiple frequency bands are used in the communications system, where each frequency band uses a different carrier frequency. A wireless terminal, e.g., mobile node listens to one frequency band at a time, e.g., the frequency band corresponding to the carrier which the mobile uses for receiving and/or transmitting user data such as voice, text, video or other application data. As the wireless terminal receives signals in this particular exemplary embodiment, it performs a time to frequency domain conversion operation, e.g. by performing a Fourier Transform operation on a received signal such as a FFT or DFT. The resulting time to frequency transform operation produces a plurality of signal components, e.g., signal tones, corresponding to different frequencies of the signal band being monitored. Energy detection is performed on the different signal components to generate an estimate of the energy of each signal component, e.g., an estimate of the energy in each, or a plurality of, the different signal tones present in the received signal is generated. Bases on the signal component energy, a determination is made as to whether the signal component corresponds to a received beacon signal. This beacon determination step may be implemented by comparing the signal component energy to a threshold energy level which, when exceeded, indicates the presence of a beacon signal. When a signal component corresponding to a beacon signal is detected, the frequency of the signal component and thus the frequency of the detected beacon signal is then used to determine cell, sector and/or carrier information corresponding to the base station transmitter that transmitted the beacon signal which was detected. In various embodiments, the detected energy of the beacon signal components corresponding to beacons received from different transmitters is compared. Carrier selection and handoff decisions are based on the result of the beacon signal strength, e.g., energy, comparisons. A decision to implement a handoff from an attachment point corresponding to a first received beacon signal and a different attachment point corresponding to another beacon signal may be based on a variety of factors in addition to the relative beacon signal strengths including, e.g., changes in relative beacon strength over time, the current beacon signal strength dropping below a predetermined threshold or exceeding a predetermined threshold, and/or a beacon signal strength corresponding to a particular transmitter remaining above a predetermined threshold level for a period of time.

The above exemplary embodiment is intended to be exemplary. Some implementations taking advantage of the present invention will perform all, most or many of the above described steps. However, it should be noted that other implementations will use only a few of the above described steps in combination while still achieving benefits from the present invention.

Numerous additional features, benefits and embodiments of the present invention are discussed in the detailed description which follows.

DETAILED DESCRIPTION OF THE INVENTION

Figure 1:
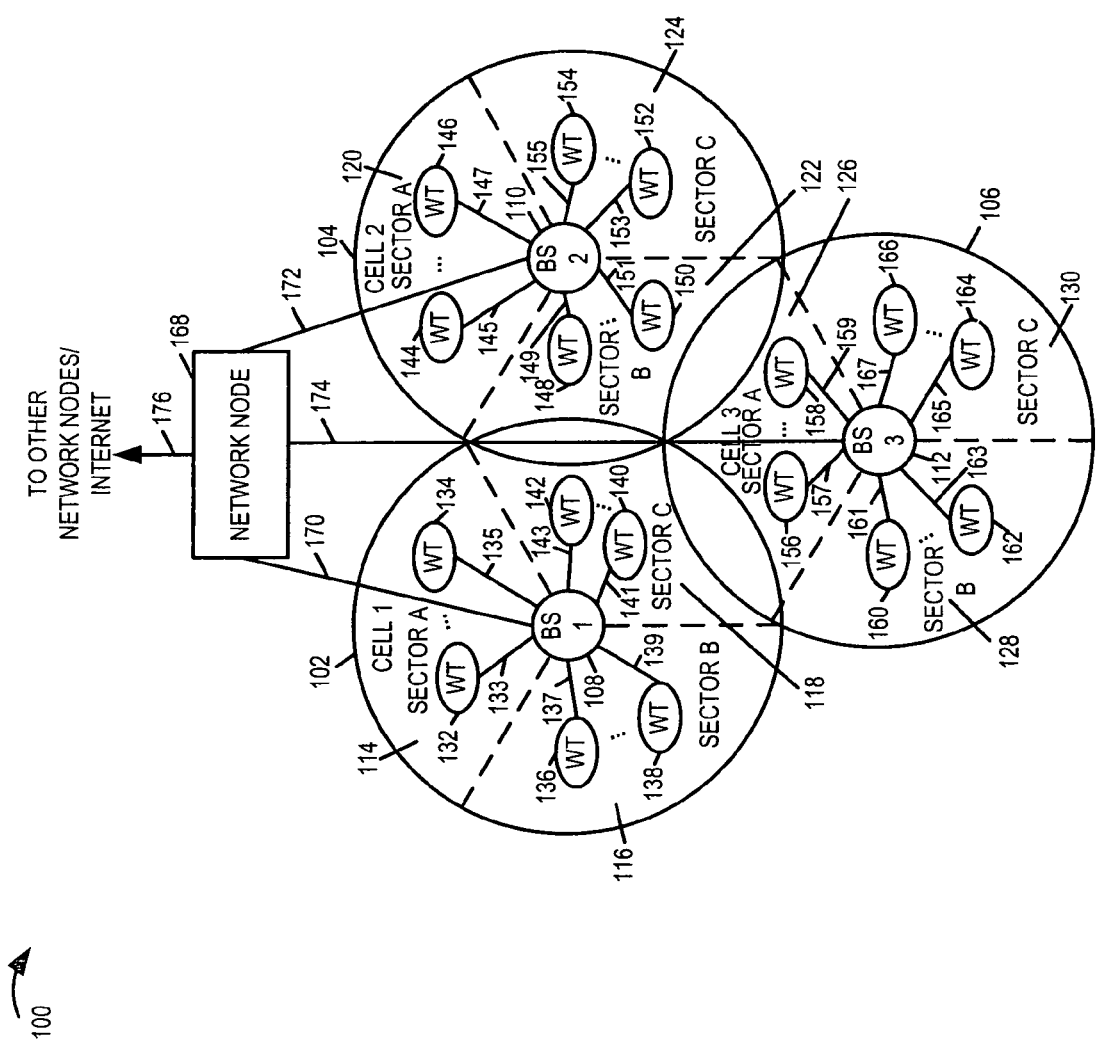
FIG. 1 is a drawing of an exemplary wireless communications system supporting multiple carriers implemented in accordance with the invention and using methods of the present invention.

FIG. 1 shows an exemplary wireless communications system 100, supporting multiple carriers and spread spectrum signaling, implemented in accordance with the present invention. The system 100 uses apparatus and methods of the present invention. FIG. 1 includes a plurality of exemplary multi-sector cells, cell 1 102, cell 2 104, cell 3 106. Each cell (102, 104, 106) represents a wireless coverage area for a base station (BS), (BS1 108, BS2 110, BS 3 112), respectively. In the exemplary embodiment, each cell 102, 104, 106 includes three sectors (A, B, C). Cell 1 102 includes sector A 114, sector B 116, and sector C 118. Cell 2 104 includes sector A 120, sector B 122, and sector C 124. Cell 3 106 includes sector A 126, sector B 128, and sector C 130. In other embodiments, different numbers of sectors per cell are possible, e.g., 1 sector per cell, 2 sectors per cell, or more than 3 sectors per cell. In addition, different cells may include different numbers of sectors.

Wireless terminals (WTs), e.g., mobile nodes (MNs), may move throughout the system and communicate with peer nodes, e.g., other MNs, via wireless links to BSs. In cell 1 102 sector A 114, WTs (132, 134) are coupled to BS 1 108 via wireless links (133, 135), respectively. In cell 1 102 sector B 116, WTs (136, 138) are coupled to BS 1 108 via wireless links (137, 139), respectively. In cell 1 102 sector C 118, WTs (140, 142) are coupled to BS 1 108 via wireless links (141, 143), respectively. In cell 2 104 sector A 120, WTs (144, 146) are coupled to BS 2 110 via wireless links (145, 147), respectively. In cell 2 104 sector B 122, WTs (148, 150) are coupled to BS 2 110 via wireless links (149, 151), respectively. In cell 2 104 sector C 124, WTs (152, 154) are coupled to BS 2 110 via wireless links (153, 155), respectively.

BSs may be coupled together via a network, thus providing connectivity for WTs within a given cell to peers located outside the given cell. In system 100, BSs (108, 110, 112) are coupled to network node 168 via network links (170, 172, 174), respectively. Network node 168, e.g., a router, is coupled to other network nodes, e.g., other base stations, routers, home agent nodes, AAA server nodes, etc., and the Internet via network link 176. Networks links 170, 172, 174, 176 may be, e.g., fiber optic links.

BSs 108, 110, 112 include sectorized transmitters, each sector transmitter using a specific assigned carrier frequency for ordinary signaling e.g., downlink traffic signals directed to specific WT(s), in accordance with the invention. The sector transmitter's assigned carrier frequency used for ordinary signaling also conveys broadcast signals such as, e.g., assignment signals, pilot signals, and/or beacon signals, from the BS to WTs. In addition, in accordance with the invention, each base station sector transmitter transmits additional downlink signals such as, e.g., pilot signals and/or beacon signals within the carrier frequency bands assigned to adjacent cell/sector transmitters for their ordinary signaling. Such downlink signals provide information to the WTs, e.g., WT 132, which may be used to evaluate and decide which carrier frequency to select and which corresponding base station sector/cell to use as an attachment point. The WTs, e.g., WT 132, include receivers with the capability to process information from BSs 108, 110, 112 sector transmitters providing information on alternative carrier frequencies bands that may be used for ordinary communications, e.g., downlink traffic channel signaling, and that may be selected by the WT.

Figure 2:
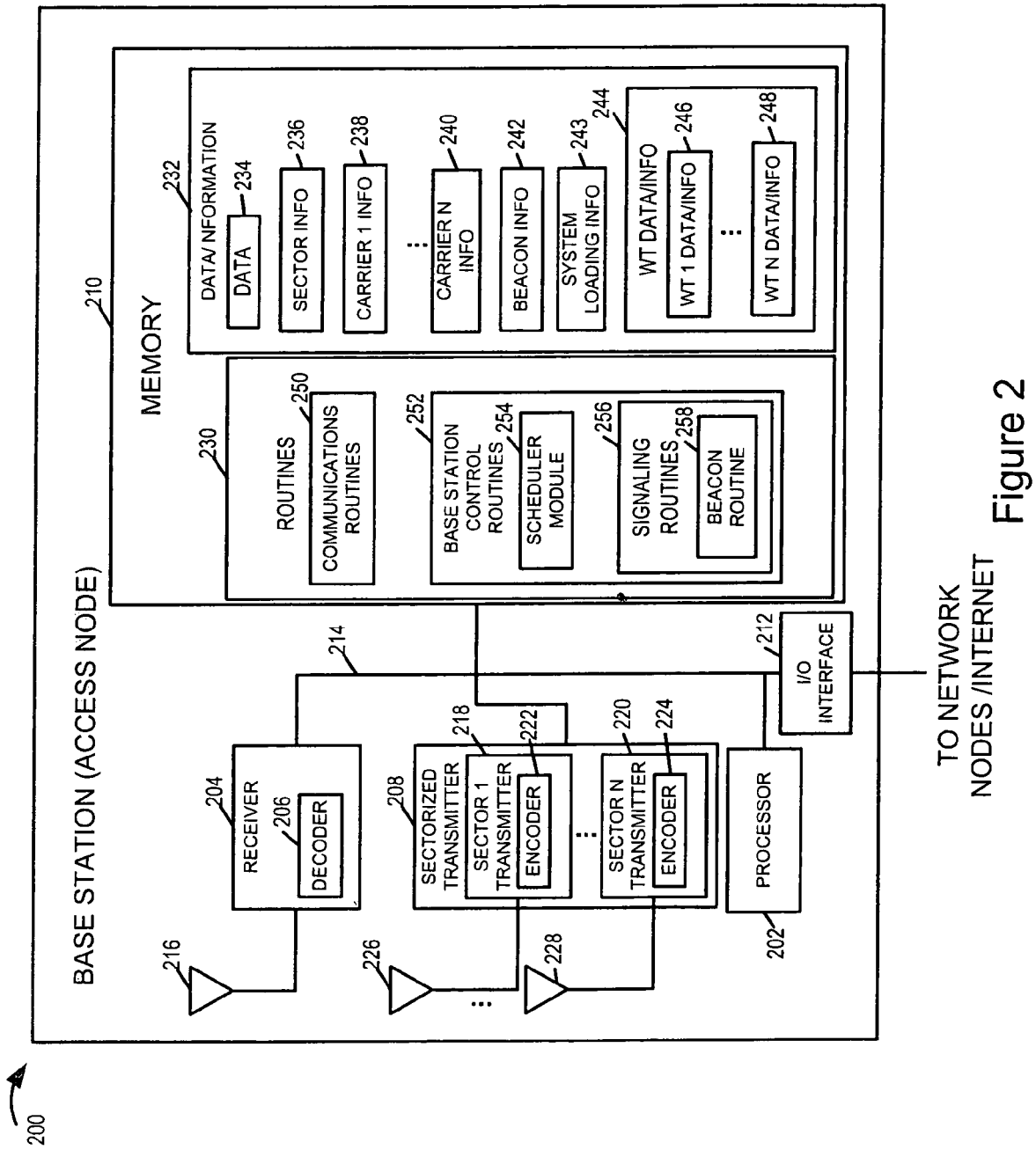
FIG. 2 is a drawing of an exemplary base station implemented in accordance with the present invention and using methods of the present invention.

FIG. 2 illustrates an exemplary base station 200, alternately referred to as an access node, implemented in accordance with the present invention. The BS is called an access node because it serves as a WT's point of network attachment and provides the WT access to the network. The base station 200 of FIG. 2 may be a more detailed representation of any of the base stations 108, 110, 112 of the system 100 of FIG. 1. The base station 200 includes a processor 202, e.g., CPU, a receiver 204 including a decoder 206, a sectorized transmitter 208, a memory 210, and an I/O interface 212 coupled together via a bus 214 over which the various elements can interchange data and information. The receiver 204 is coupled to a sectorized antenna 216 and can receive signals from wireless terminals 300 (see FIG. 3) in each of the sectors covered by the base station 200. The receiver's decoder 206 decodes received uplink signals and extracts the information encoded by the WTs 300 prior to transmission. The sectorized transmitter 208 includes a plurality of transmitters, a sector 1 transmitter 218, a sector N transmitter 220. Each sector transmitter (218, 220) includes an encoder (222, 224), for encoding downlink data/information, and is coupled to an antenna (226, 228), respectively. Each antenna 226, 228 corresponds to a different sector and is normally oriented to transmit into the sector to which the antenna corresponds and may be located. Antennas 226, 228 may be separate or may correspond to different elements of a single multi-sector antenna which has different antenna elements for different sectors. Each sector transmitter (218, 220) has an assigned carrier frequency band to be used for ordinary signaling, e.g., downlink traffic signaling. Each sector transmitter (218, 220) is capable of transmitting downlink signals, e.g., assignment signals, data and control signals, pilot signals, and/or beacon signals in its own assigned carrier frequency band. Each sector transmitter (218, 220), in accordance with the invention, also transmits additional downlink signals, e.g., pilot signals and/or beacon signals into other carrier frequency bands, e.g., the carrier frequency bands assigned to adjacent cells/sectors for their ordinary signaling. The base station I/O interface 212 couples the base station 200 to other network nodes, e.g., other access nodes, routers, AAA servers, home agent nodes, and the Internet. The memory 210 includes routines 230 and data/information 232. The processor 202 executes routines 230 and uses the data/information 232 in the memory 210 to control the operation of the base station 200 including scheduling users on different carrier frequencies using different power levels, power control, timing control, communication, signaling, and beacon signaling in accordance with the invention. The scheduling of a particular user, e.g., a particular WT 300, on a particular carrier frequency, may be in response to a selection performed by the WT 300, in accordance with the invention.

The data/information 232 in the memory 210 includes data 234, e.g., user data to be transmitted to and received from wireless terminals 300, sector information 236 including carrier frequencies associated with each sector and data transmission power levels associated with each carrier frequency within the sector, a plurality of carrier frequency information (carrier 1 info 238, carrier N info 240), beacon information 242, and system loading information 243. Carrier frequency information (238, 240) includes information defining the frequency of the carrier and the associated bandwidth. The beacon information 242 includes tone information, e.g., information associating beacon signals in each sector with specific frequencies and carriers, and sequence timing associated to transmit the beacon signals. The system loading information 243 includes composite loading information on each of various carrier bands supported by the base station 200. System loading information 243 may be transmitted from the base station 200 to the WTs 300 which may use the information, in some embodiments, in the decision process of the selection of carrier band to set within the WT receiver.

The data/information 232 in memory 210 also includes a plurality of WT data/information 244 sets, a set for each WT: WT 1 data/info 246, WT N data/info 248. WT 1 data/info 246 includes user data in route from/to WT 1, a terminal ID associating the WT to the base station 200, a sector ID identifying the sector in which WT 1 is currently located and carrier frequency information associating WT 1 to a specific carrier frequency used for ordinary signaling.

Base station routines 230 include communications routines 250, and base station control routines 252. The communications routines 250 implement the various communications protocols used by the base station 200. The base station control routines 252 include a scheduler module 254 and signaling routines 256. The base station control routines 252 control base station operation including the receiver 204, transmitters (218, 220), scheduling, signaling, and beacon signaling in accordance with the present invention. The scheduler module 254, e.g., a scheduler, is used for scheduling air link resources, e.g. bandwidth over time, to wireless terminals 300 for uplink and downlink communications. Base station control routines 252 also include signaling routines 256 which control: the receiver 204, the decoder 206, the transmitters (218, 220), the encoders (222, 224), ordinary signal generation, data and control tone hopping, and signal reception. The beacon routine 258, also included in the signaling routines 256, uses the beacon information 242 to control the generation and transmission of beacon signals in accordance with the invention. In accordance with the invention, in some embodiments, beacon signals, e.g., high power signals which are relatively narrow in terms of frequency, may be transmitted in each sector in each of the carrier frequency bands used by that sector/cell or by an adjacent sector/cell. These beacon signals are, in some embodiments, used by the WTs 300 to compare alternative available carriers.

Figure 3:
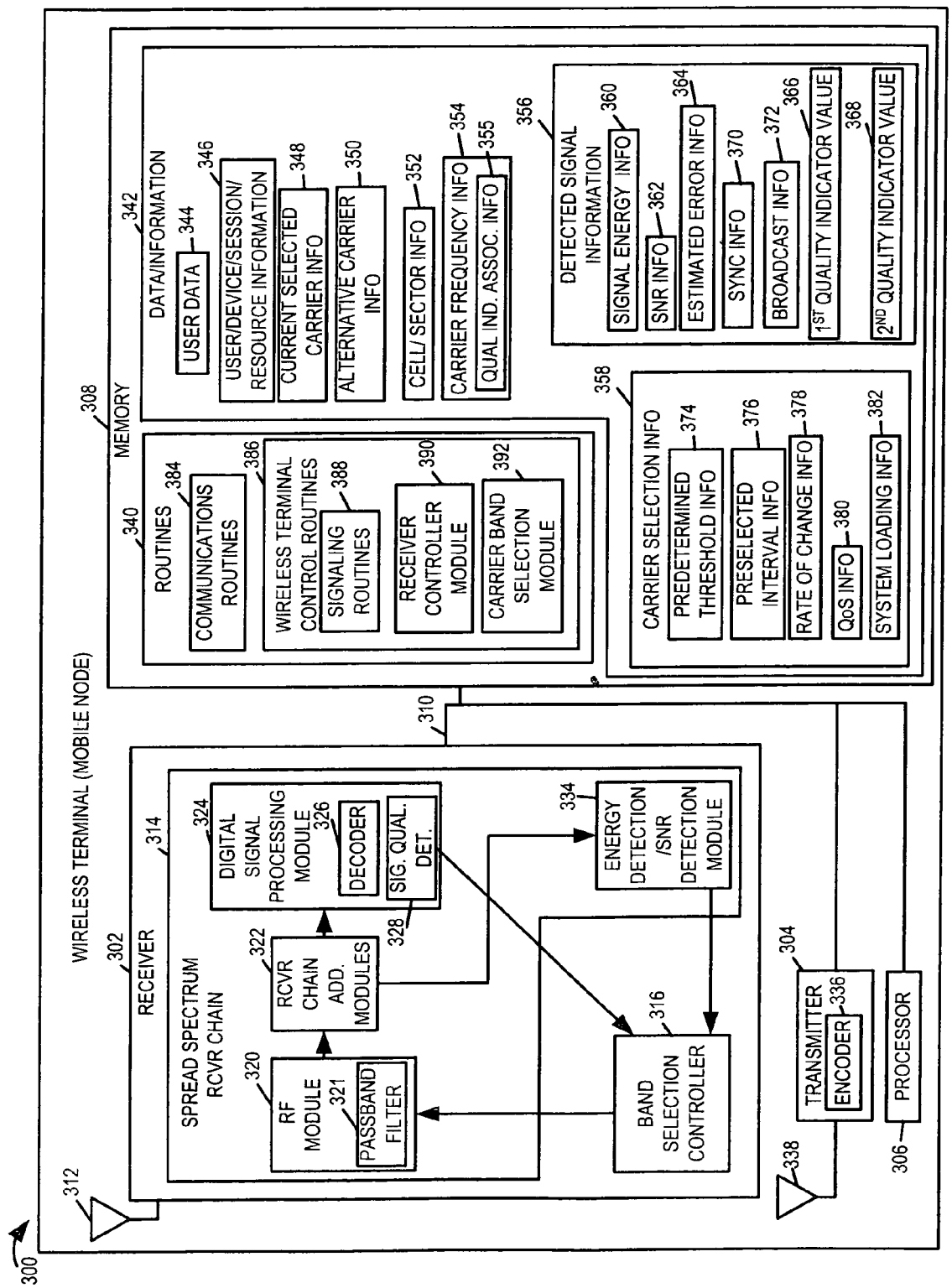
FIG. 3 is a drawing of an exemplary wireless terminal implemented in accordance with the present invention and using methods of the present invention.

FIG. 3 illustrates an exemplary wireless terminal 300, e.g., mobile node, implemented in accordance with the present invention and using methods of the present invention. The wireless terminal 300 of FIG. 3 may be a more detailed representation of any of the WTs 132, 134, 136, 138, 140, 142, 144, 146, 148, 150, 152, 154, 156, 158, 160, 162, 164, 166 of the system 100 of FIG. 1. The wireless terminal 300 includes a receiver 302, a transmitter 304, a processor 306, e.g., CPU, and memory 308 coupled together via a bus 310 over which the various elements can interchange data and information.

The receiver 302 is coupled to an antenna 312 through which downlinks signals are received from a plurality of base station sector transmitters and corresponding sector antennas 226, 228. The receiver 302 includes a single spread spectrum receiver chain 314, and a band selection controller 316. The spread spectrum receiver chain 314 includes a RF module (frequency synchronization circuit) 320 for performing filtering and other operations. The RF module 320 includes a controllable passband filter 321 for rejecting frequencies outside a selected band while passing frequencies, e.g., the carrier signal, falling within the selected band. Additional modules 322 are also included in the receiver chain 314 along with a digital signal processing module 324, and an energy detection/SNR detection module 334. Digital signal processing module 324 includes a decoder 326 and a signal quality detector module 328.

The RF module 320, receiver chain additional modules 322, digital signal processing module 324, and energy detection/SNR detection module 334 are used for receiving, decoding, measuring, and evaluating various signals, including, e.g., assignment signals, downlink traffic channel data and information signals, pilot signals, and/or beacon signals, being communicated by a plurality of cell/sector base station transmitters using a currently selected first band associated with a specific first carrier frequency. Band selection controller 316 outputs a signal to the RF module 320 and adjustable filter 321 included therein to select a specific carrier frequency; the RF module 320 passes received signal components within the selected carrier frequency band and rejects at least some of the signals outside the selected carrier frequency band. RF module 320 also performs additional processing, e.g., signals are mixed to baseband. Output signals passed by the RF module 320 are processed, e.g., filtered by a baseband filter, converted from analog to digital signals, and additionally filtered by a digital filter, by the receiver chain additional modules 322. Then, signals are output from the additional modules 322 and forwarded to the digital signal processing module 324 and the energy detection/SNR detection module 334. Some signal components, e.g., from a first base station cell/sector transmitter corresponding to the currently selected band are processed by the digital signal processing module 324; while other signal components, e.g., from a second cell/sector transmitter corresponding to a different carrier band are processed by the energy detection/SNR detection module 334. The digital signal processing module includes decoder 326 which can decode downlink traffic signals directed to a specific WT 300; while energy detection/SNR detection module 334 does not include such decoding capability.

Outputs, e.g., quality indicator values, from the signal quality detector module 328 of the digital signal processing module 324 and from the energy detection/SNR detection module 334 are input to the band selection module 316, which controls the selection of the frequency band setting in the RF module (frequency synchronization circuit) 320, in accordance with the invention.

Transmitter 304 includes an encoder 336 and is coupled to transmitter antenna 338. Data/information, e.g., blocks of uplink data/information may be encoded by encoder 336 and then transmitted through antenna 338 to base station 200.

The memory 308 includes routines 340 and data/information 342. The processor 306, e.g., a CPU, executes the routines 340 and uses the data/information 342 in memory 308 to operate the WT 300 and implement the methods of the present invention.

Wireless terminal data/information 342 includes user data 344, user device/session resource information 346, current selected carrier information 348, alternative carrier information 350, cell/sector information 352, carrier frequency information 354, detected signal information 356, and carrier selection information 358.

User data 344 includes data, information and files intended to be sent to/or received from a peer node in a communications session with the wireless terminal 300. User/device/session resource information 346 includes, e.g., terminal ID information, base station ID information, sector ID information, selected carrier frequency information, mode information, and identified beacon information. The terminal ID information may be an identifier, assigned to the WT 300 by the base station 200 to which the WT 300 is coupled, that identifies the wireless terminal 300 to the base station 200. Base station ID information may be, e.g., a value of slope associated with the base station 200 and used in hopping sequences. Sector ID information includes information identifying the sector ID of the sectorized base station's transmitter/receiver through which ordinary signaling is being communicated, and may correspond to the sector of the cell in which the wireless terminal 300 is located. Selected carrier frequency information includes information identifying the carrier, e.g., the carrier to which the RF module has been tuned, being used by the BS for downlink data signaling, e.g. traffic channel signals. Mode information identifies whether the wireless terminal is in an on/hold/sleep state.

Current selected carrier information 348 includes information identifying the selected carrier to which RF module 320 has been tuned by the band selection controller 316. Alternative carrier information 350 includes information identifying the alternative carrier to which the information being evaluated by the energy detection/SNR detection module 334 corresponds. Cell/sector ID information 352 may include information used to construct hopping sequences used in the processing, transmission, and reception of data, information, control signals, and beacon signals. Carrier frequency information 354 may include information associating each sector/cell of the base stations in the communications system with a specific carrier frequency or frequencies, frequency bands, beacon signals, and sets of tones. Carrier frequency information 354 also includes quality indicator association information 355 which associates each quality indicator value with a specific carrier frequency, which may be selected by the band selection controller 316.

Detected signal information 356 includes signal energy information 360, SNR information 362, estimated error information 364, a $1^{st}$ quality indicator value 366, and a $2^{nd}$ quality indicator value 368. Detected signal information 356 also includes synchronization information 370 and broadcast signal information 372.

The detected signal information 356 includes information which has been output from the signal quality detector 328 of the digital signal processing module 324 and from the energy detection/SNR detection module 334 in the receiver 302. Signal quality detector module 328 may measure and record signal energy 360, SNR 362, and/or estimated error rate 364 of a signal component from the first transmitter and determine a $1^{st}$ quality indicator value 366 indicative of the quality of the channel, e.g., downlink traffic channel, between the first transmitter and the WT 300 when using the carrier band to which the receiver 302 is currently set. Energy detection/SNR detection module 334 may measure and record signal energy 360 and/or SNR 362 of a component signal from the second transmitter to determine a $2^{nd}$ quality indicator value 368 indicative of a potential channel, e.g., downlink traffic channel between the second transmitter and WT 300 on a alternative carrier band.

Synchronization information 370 may include, in some CDMA embodiments, e.g., pilot signal based timing synchronization information used and/or obtained by the receiver, e.g., while processing a CDMA pilot signal. In some OFDM embodiments, the synchronization information may include symbol timing recovery information. Broadcast information 372 may include, e.g., broadcast related information used and/or obtained by the receiver while processing signals, e.g., pilot or beacon signals.

Carrier selection information 358 includes predetermined threshold information 374, pre-selected interval information 376, rate of change information 378, quality of service (QoS) information 380, and system loading information 382. The carrier selection information 358 is information, e.g., criteria, limits, etc., used by the WT 300 in making band selection decisions when evaluating the detected signal information, e.g., when comparing $1^{st}$ quality indicator value 366 to $2^{nd}$ quality indicator value 368. Predetermined threshold information 374 includes levels used to compare against quality indicator values 366, 368 for making band selection decisions. Pre-selected interval information 376 includes time intervals of a fixed duration and intervals of a fixed number of signal measurements, each which may be used to define a predetermined interval in which a consistent condition should exist, e.g., second quality indicator exceeds first quality indicator, before the band selection controller 316 changes the selection for the receiver RF module 320. Rate of change information 378 includes criteria used to identify when the first signal quality indicator value 366 decreases over time while the second signal quality indicator value 368 increases over time and a difference between the first and second quality indicator values changes sign. Quality of Service (QoS) information 380 includes information pertaining to the QoS provided to individual users, band selection as a function of the level of QoS to be provided to a user, and changes in selection as a result of changes in levels of QoS to be provided to the user. System loading information 382 includes received information pertaining to system loading communicated by a base station 200 which may be used in a function controlling decisions regarding band selection.

WT routines 340 include communications routines 384 and wireless terminal control routines 386. Wireless terminal communications routine 384 implements the various communication protocols used by the wireless terminal 300. Wireless terminal control routines 386 perform the functional control operations of the wireless terminal 300 including power control, timing control, signaling control, data processing, I/O, receiver control and carrier band selection functions in accordance with the invention. The WT control routines 386 include signaling routines 388, a receiver controller module 390 and a carrier band selection module 392. The signaling routines 388 using the data/information 342 in memory 308 control the signaling, e.g., uplink and downlink communicated signals, of the WT 300. The receiver controller module 390 in coordination with modules 324, 334 controls operation of the receiver 302 including the decoding, energy detection and/or SNR detection performed on received signals and the generation of $1^{st}$ and $2^{nd}$ quality indicator values 366, 368, in accordance with the present invention. The carrier band selection module 392 in coordination with the band selection controller 316 uses the data/information derived from the received signals including $1^{st}$ and second quality indicator values 366, 368 as well as carrier selection information 358 to make decisions as to which carrier to select for tuning the RF module 320 of the receiver 302, in accordance with the present invention.

Figure 4:
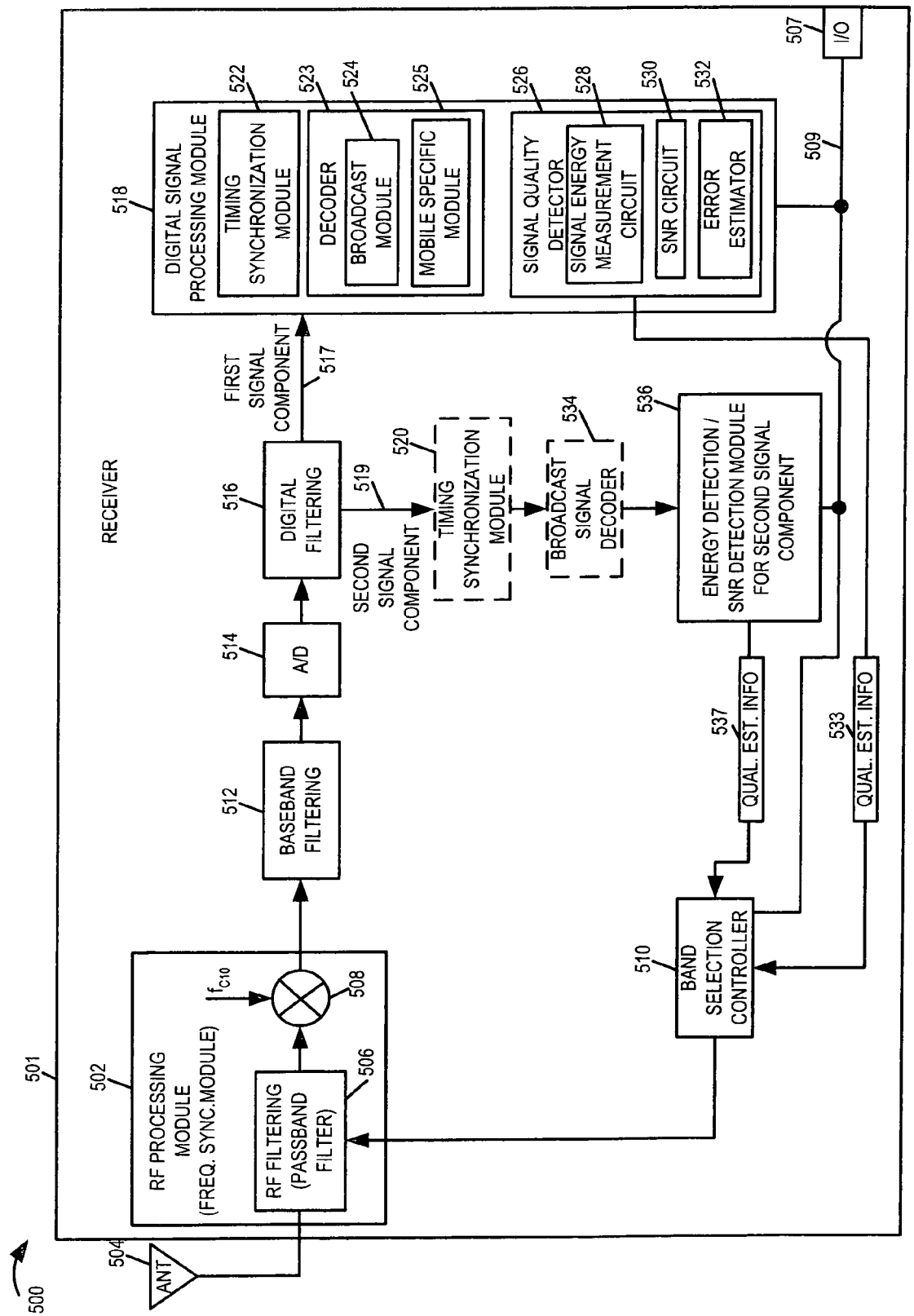
FIG. 4 is a drawing of an exemplary embodiment of a receiver that can process two components of a received signal from the same selected carrier band at the same time, each component conveying different information, e.g., information corresponding to one of two different carrier bands, the receiver implemented in accordance with the present invention and using methods of the present invention.

FIG. 4 is example of an exemplary wireless terminal receiver 501/antenna 502 combination 500 implemented in accordance with the present invention. The receiver/antenna combination 500 of FIG. 4 may be used as the receiver 302/antenna 312 combination in the WT 300 of FIG. 3. Receiver 501 illustrates an exemplary embodiment of a receiver, in accordance with the invention, that can process two components of a received signal included in the same selected carrier band at the same time, each component conveying different information, e.g., information corresponding to one of two different carrier bands transmitted by different transmitters and/or different transmit antennas. The two signal components may correspond to different sectors of a cell and/or different cells.

The receiver 501 of FIG. 4 uses a single RF processing chain which includes a single RF processing module (frequency synchronization module) 502. The receiver 501 is coupled to an antenna 504 which receives downlink signals from a plurality of sector/cell base station transmitters. The antenna 504 is coupled to the RF processing module 502. The RF processing module 502 includes a selectable RF filter 506 and a mixer circuit 508. The RF filter 506 may be implemented as a passband filter and serves as a frequency synchronization circuit. The RF processing module 502 has been tuned to a carrier frequency selected by a band selection controller 510. The RF filter passes received signal components within the selected carrier band and rejects at least some signal components outside the selected carrier band.

The received passband signal from the antenna 504 is input to the RF filter 506 and processed by a mixer circuit 508 resulting in a baseband signal. The resulting baseband signal is output from the RF processing module 502 and input to a baseband filter 512. The filtered output from the baseband filter 512 is input to an A/D convertor module 514, where analog to digital conversion is performed. The resulting output digital signal is input to a digital filter 516 for additional filtering. Then an output of the digital filter 516, a first signal component 517, e.g., originally sourced from a first base station cell/sector transmitter, is input to a digital signal processing module 518, while another output of the digital filter 516, a second signal component 519, e.g., originally sourced from a second cell/sector base station transmitter is output to an energy detection/SNR detection module 536. The digital signal processing module 518 includes a timing synchronization module 522, a decoder 523, and a signal quality detector 526. Thus digital signal processing module 518 is capable of fully decoding broadcast as well as WT specific information, e.g., information intended for the individual WT and not other WTs.

The timing synchronization module 522 is used for timing synchronization of received data being processed, e.g., received downlink signals. CDMA as well as OFDM embodiments are contemplated. The timing synchronization module 522 in CDMA embodiments may be implemented using known de-spreading techniques. The timing synchronization module 522 in OFDM embodiments may implemented as a symbol timing recovery circuit using known techniques. The decoder 523 includes a broadcast module 524 for decoding received broadcast signals, e.g., beacon signals, pilot signals, etc., and a mobile specific module 525 for decoding received downlink data/information, e.g., downlink traffic signals, intended for the specific WT 300 to which receiver 501 belongs.

The signal quality detector 526 includes a signal energy measurement circuit 528, a SNR circuit 530, and/or an error estimator 532. The signal quality detector 526 obtains a quality estimate for the channel, from first base station cell/sector transmitter to WT 300, being used for downlink traffic channel signaling. The quality estimate is based on the signal energy measurement circuit 528 output (e.g., the quality estimate may be the energy measured in a signal component such as a beacon tone or is based on the energy of the signal or signal component), the SNR circuit 530 output which is a function of measured signal energy, and/or a measured or estimated error rate of received data/information determined by error estimator 532. Signal quality estimate information 533, e.g., a quality indicator value corresponding to the currently selected carrier band, is forwarded to the band selection controller 510 to be used in making a band selection decision.

In the FIG. 4 implementation, second signal component processing is shown as being performed by a separate set of receiver components, e.g., optional timing synchronization module, optional broadcast decoder 534, and energy detection/SNR detection module 536. However, it should be appreciated that the elements of the digital signal processing module 518 can be used on a time shared basis where the first and second signal components are of the same type, e.g., OFDM signals. In cases where the second signal component is a beacon signal or other signal where timing synchronization and/or decoding are not required to generate a quality indicator value, timing synchronization module 520 and broadcast signal decoder 534 may be omitted. However, in cases where the first signal component corresponds to a signal of a first type, e.g., an OFDM signal, and the second signal component corresponds to a signal of a second type, e.g., a CDMA signal, separate signals and/or modules for generating signal quality values for the first and second signal components may be more cost effective than using circuitry, e.g., re-configurable circuitry which can be configured to handle signals of different types.

In some embodiments, e.g., CDMA embodiments, the second signal component 519 is processed through a timing synchronization module 520. The timing synchronization module 520 in CDMA embodiments may be implemented using known de-spreading techniques. In some embodiments, e.g., various CDMA embodiments, the second signal component 519 is also processed through a broadcast signal decoder 534.

The second signal component, which may have been subjected to the optional processing described above, is input to the energy detection and/or SNR detection module 536. The processed received signal component being evaluated by the energy detection and/or SNR detection module 536 may be, e.g., in some OFDM embodiments, a detected beacon signal transmitted from a second transmitter, e.g., an adjacent cell/sector base station transmitter with respect to the first cell/sector base station transmitter which transmits the first signal component. Thus, in some embodiments the quality estimate information 537 is a value indicating the energy detected in a beacon signal, e.g., a beacon tone, or based on the energy of a beacon signal. The processed received signal component being evaluated by the energy detection and/or SNR detection module 536 may be, e.g., in some CDMA embodiments, a detected pilot signal transmitted from a second transmitter, e.g., an adjacent cell/sector base station transmitter with respect to the first cell/sector base station transmitter which transmits the first signal component. The energy detection and/or SNR detection module 536 generates information which can be used as a a quality estimate for a potential downlink channel between the second cell/sector base station transmitter and WT 300 corresponding to the second signal component being evaluated, the signal quality estimate information 537. The generated quality estimate is based on the signal energy measurement or an SNR measurement which is a function of detected signal energy. Signal quality estimate information 537 is forwarded to the band selection controller 510 for use in making band selection decisions, e.g., for selecting between first and second frequency bands corresponding to the first and second components respectively.

In several embodiments, the energy detection and/or SNR detection module 536 is simpler in computational complexity, e.g., either in number of gates or in executable instructions, than the digital signal processing module 518. This is possible because, in many cases, to generate the quality estimate information corresponding to the second signal component it is not necessary to decode the received signal component, and, in cases where decoding is used, it can be limited to decoding of broadcast data which is usually easier to decode than mobile specific data due to the type of coding used compared to the case of mobile specific data and/or the power transmission level of the broadcast data which is often higher than the power transmission level of mobile specific data since the broadcast signal is intended to reach multiple mobile devices.

The signal component quality information (533, 537) forwarded from the digital signal processing module 518 and the energy detection and/or SNR detection module 536, respectively, is used by the band selection controller 510 to make decisions concerning the settings of the carrier frequency band to be used by RF processing module 502, e.g., which band and thus, base station sector transmitter, should be selected for receiving downlink communications.

In some embodiments, the receiver 501 in FIG. 4 is a spread spectrum receiver which processes a spread spectrum signal, e.g. CDMA and/or OFDM. In some OFDM embodiments, the optional timing synchronization module 520 corresponding to the second component is not used. In some OFDM embodiments, the broadcast signal decoder 534 may be used, while in other OFDM embodiments, the broadcast signal decoder 534 is not needed and is omitted. In embodiments where the second signal component is a CDMA signal, the timing synchronization module 520 is used, while the broadcast signal decoder 534 may or may not be used.

Receiver 501 of FIG. 4 includes an I/O interface 507 coupled to digital signal processing module 518, the energy detection/SNR detection module 536, and the band selection controller 510 via bus 509 over which the various elements may interchange data and information. In other embodiments, bus 509 may be coupled to other receiver components, e.g., broadcast signal decoder 534, and/or timing synchronization decoder 534. The receiver 501 may communicate with other elements of the WT 300 via I/O interface 507 which couples receiver 501 to bus 312. Decoded downlink traffic channel signals may be conveyed via interface 507, e.g., to one or more external devices such as a display and/or other WT components.

Figure 5:
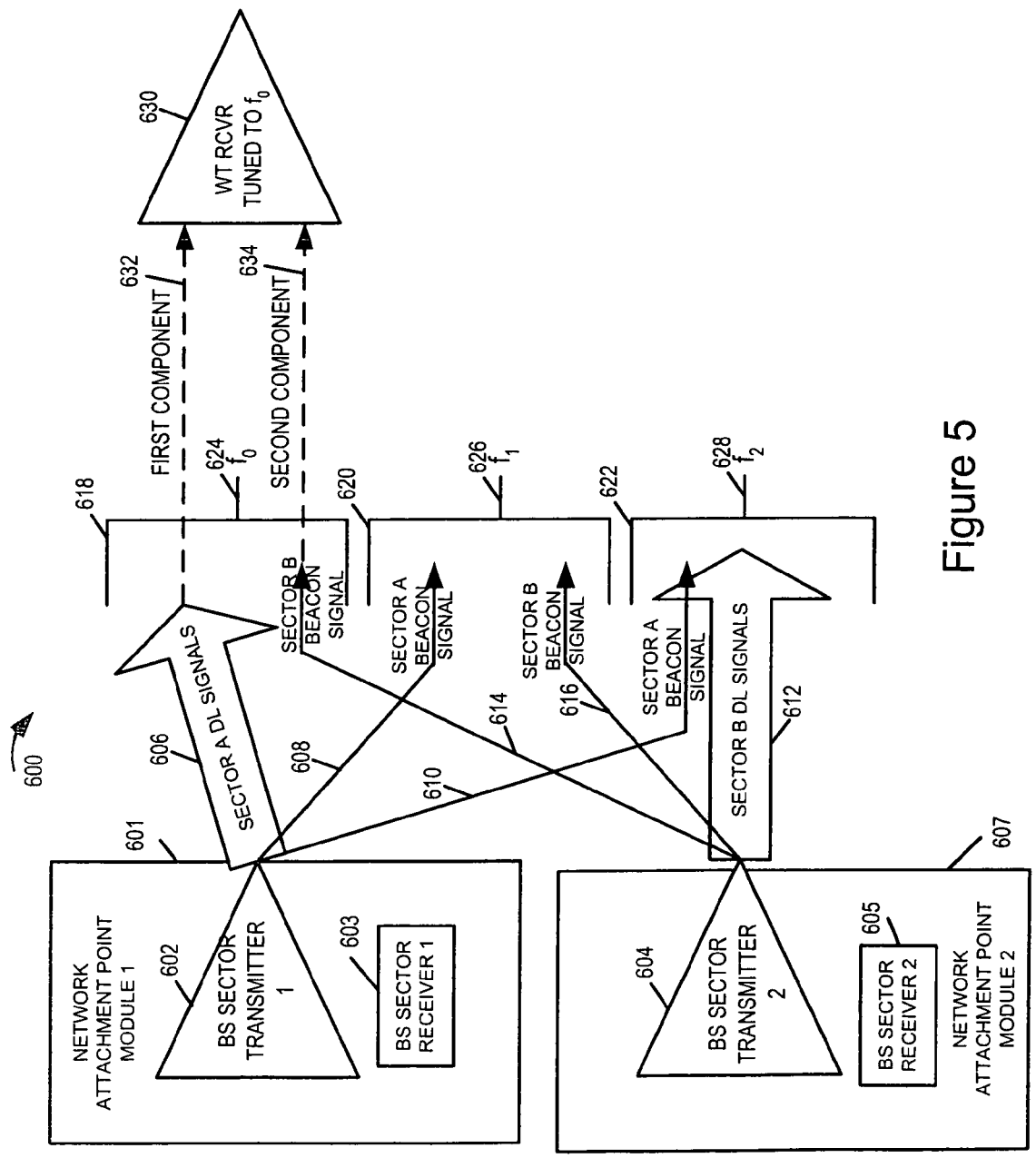
FIG. 5 is a drawing illustrating exemplary base station signaling associated with an exemplary wireless terminal embodiment utilizing an exemplary embodiment of the single receiver chain receiver of FIG. 4 in accordance with the invention.

FIG. 5 is an illustration 600 used to explain an exemplary embodiment of the invention using the single RF processing module receiver 500 of FIG. 4. Two network attachment points 101, 607 are shown. Each network attachment point can serve as a wireless terminal's attachment point, via a wireless connection, to the network. The network attachment points 601, 607 can be in the same cell, different cells, and even within the same sector of a cell depending on the embodiment. Each of the network attachment points 601, 602 use a different frequency band for communicating user data. Network attachment point module 1 601 includes a first BS transmitter 602 and a first BS sector receiver 603. The second network attachment point module 607 includes a second base station sector transmitter 604 and a corresponding BS sector receiver 605.

Use of first and second transmitters 602, 604, corresponding to different network attachment points, will now be described using as an example a case where the first transmitter 602 corresponds to Sector A of exemplary cell 102 and the second transmitter 602 corresponds to Sector B of exemplary cell 102. Transmitters 602, 604 are transmitting downlink signals including, e.g., ordinary traffic channel signals, e.g., user data, optionally pilot signals, and beacon signals. The transmitters 602, 604 may use different antennas directed towards different sectors or cells. Signaling from each sector transmitter includes ordinary signaling, e.g., assignment signals, optionally pilot signals, and/or optionally beacon signals, in its own designated carrier frequency band and beacon signals in one or more, e.g., the other two, carrier frequency bands used in a cell. BS sector A transmitter 602 transmits downlink signals 606 including, e.g., sector A downlink traffic signals, sector A assignment signals, optionally sector A pilot signals, and/or optionally sector A beacon signals into a frequency band 618 with carrier frequency $f_0$ 624, sector A beacon signals 608 into a frequency band 620 with carrier frequency $f_1$ 626, and sector A beacon signals 610 into a frequency band 622 with carrier frequency $f_2$ 628. BS sector B transmitter 604 transmits downlink signals 612 including, e.g., sector B downlink traffic signals, sector B assignment signals, optionally sector B pilot signals, and/or optionally sector B beacon signals into frequency band 622 with carrier frequency $f_2$ 628, BS sector B transmitter 604 also transmits sector B beacon signals into frequency band 618 with carrier frequency $f_0$ 624, and sector B beacon signals 616 into frequency band 620 with carrier frequency $f_1$ 626.

Assume that a receiver 630, e.g., an exemplary embodiment of receiver 500 of FIG. 4, is tuned to carrier frequency band 618 with carrier frequency $f_0$ 624. The receiver 630 receives two signal components 632, 634, the first signal component 632, including e.g., ordinary signaling, assignment signals, pilot signals, and/or beacon signals from the sector A transmitter 602 is processed by the digital signal processing module 518, while the second signal component 634, e.g., the beacon signal from the sector B transmitter 604 is processed by the energy detection/SNR detection module 536. From first component 632 and using digital signal processing module 518, receiver 630 determines a quality estimate of the downlink traffic channel between BS sector A transmitter to receiver 630 using carrier frequency $f_0$ 624 and frequency band 618. From second component 634 and using energy detection/SNR detection module 536, receiver 630 determines a quality estimate of a potential alternate downlink traffic channel between BS sector B transmitter 604 and receiver 630 using carrier frequency $f_2$ 628 and frequency band 622.

In some embodiments of the invention, beacon signals may not be used, and other downlink signals may be received and processed for band selection decisions. For example, each sector an/or cell transmitter transmits some downlink signals, e.g., assignment signals, sector/cell base station identification signals, and/or pilot signals, in the frequency band used by that transmitter for ordinary downlink traffic channel signaling and also transmits some additional downlink signals, e.g., sector/cell base station identification signals, and/or pilot signals, into different frequency bands used by other, e.g., adjacent, sector/cell transmitters for their ordinary downlink traffic signaling. The transmission into different frequency bands may occur at periodic intervals and may correspond in duration to a small amount of time relative to the transmission of signals into the sector to which the transmitter corresponds.

A receiver, such as single RF chain receiver 500 of FIG. 4, in accordance with the invention, is tuned to one frequency band, but receives downlink signal components from multiple cell and/or sector transmitters which transmit into the frequency band. The receiver receives and processes a composite signal, the composite signal within the tuned frequency band, the composite signal including first and second components from two different transmitters. Information can be generated from the first and second signal components that can, and is, used to ascertain quality indication information concerning two alternative frequency bands, each frequency band corresponding to a different signal component.

In one particular exemplary OFDM (Orthogonal Frequency Division Multiplexed) embodiment, a beacon signal is implemented as a relatively high powered signal that is transmitted as a narrow signal in terms of frequency, e.g., using a single or a few tones. When a beacon signal is transmitted in the exemplary OFDM embodiment, most of the transmission power is concentrated on one or a small number of tones, which comprise the beacon signal. In some embodiments, the first signal component 632 includes a beacon signal component, corresponding to a first transmitter while the second signal component includes a beacon signal corresponding to a second, e.g., different transmitter which will normally correspond to a different sector and/or cell. In one such embodiment, the carrier selection is based upon evaluation of the beacon signals. In some embodiments, the beacon signals are narrow in frequency width compared to the band of the passband filter, e.g., at most 1/20 the frequency width of the passband filter.

Figure 6B:
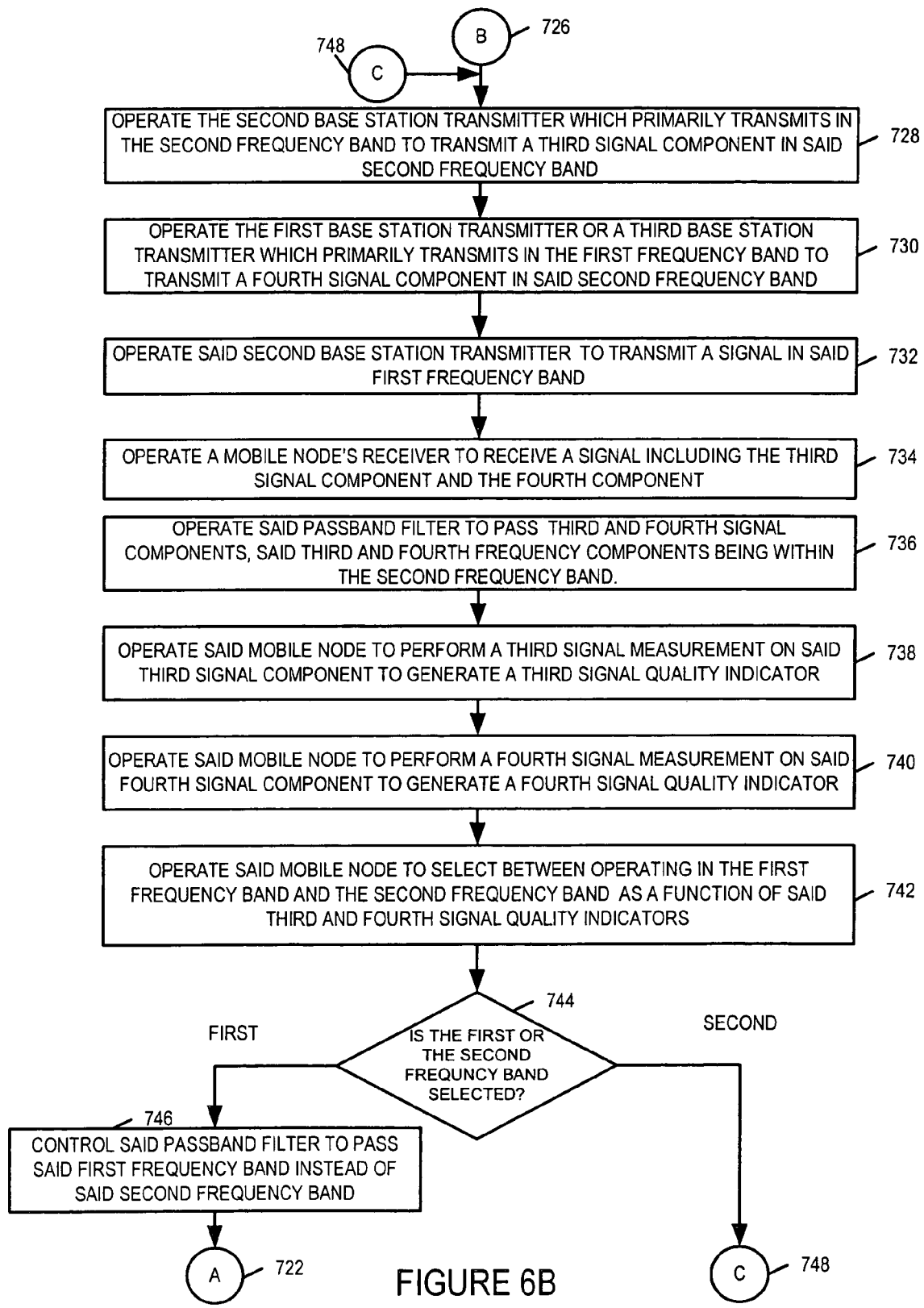
FIG. 6 is a flowchart illustrating an exemplary communications method of operating a communications system including an exemplary wireless terminal utilizing an exemplary single receiver chain receiver of FIG. 4 in accordance with the present invention.

In accordance with the present invention, the first and second signal components may be transmitted at the same time, e.g., on different frequencies within the currently selected band. Alternately, the first and second signal components can be transmitted and received sequentially. FIG. 6 is a flowchart 700 illustrating an exemplary method of operating a communications system in accordance with the present invention. FIG. 6 comprises the combination of FIGS. 6A and 6B. Operation starts in step 702, where the communications system is initialized, e.g., base stations are reinitialized and mobile nodes are powered on. Operation proceeds from step 702 to step 704.

In step 704, a first base station transmitter, which primarily transmits in a first frequency band, is operated to transmit a first signal component in said first frequency band. Operation proceeds from step 704 to step 706. In step 706, a second base station transmitter, which primarily transmits in a second frequency band, is operated to transmit, e.g., periodically, a second signal component in said first frequency band. In step 708, said first base station transmitter is operated to transmit, e.g., periodically, a signal in said second frequency band, which is different from the first frequency band. In some embodiments, the second frequency band is completely outside the first frequency band, while in other embodiments there may be a partial overlap in the first and second frequency bands. In some embodiments, the first transmitter and the second transmitter are located in different sectors of the same cell; the first signal component is transmitted using a first antenna or antenna element corresponding to a first sector of said same cell; and the second signal component is transmitted using a second antenna or antenna element corresponding to a second sector of said same cell. In some embodiments, the first transmitter and the second transmitter are located in different cells. In such an embodiment, the first signal component is transmitted using a first antenna or antenna element corresponding to a first cell, and the second signal component is transmitted using a second antenna or antenna element corresponding to a second cell. Operation proceeds from step 708 to step 710.

In step 710, a mobile node's receiver is operated to receive a signal including the first component and the second signal component. In some embodiments, the signal is received over a period of time and the first and second signal components are received at different points in time. In some embodiments, the first and second signal components are received at the same time, e.g., on different frequencies within the first frequency band.

Then in step 712, a passband filter in said mobile node's receiver is operated to pass said first and second signal components, said first and second frequency components being within a selected frequency band. The passband filter rejects signals outside the first frequency band. In some embodiments, e.g., an OFDM embodiment wherein the first and second frequency components are beacon signals, the first and second signal components are narrow in frequency width compared to the width of said passband filter, e.g., at most 1/20 the frequency width of the passband filter. In some embodiments, wherein the first and second frequency bands are at least 1 MHz in width, the passband filter has a passband less than 2 MHz in width.

Operation proceeds from step 712 to step 714. In step 714, said mobile node is operated to perform a first signal measurement on said first signal component to generate a first signal quality indicator. In step 716, said mobile node is operated to perform a second signal measurement on said second signal component to generate a second signal quality indicator. Operation proceeds from step 716 to step 718. In step 718, the mobile node is operated to select between operating in the first frequency band and the second frequency band associated with said second frequency component as a function of said first and second quality indicators. Operation proceeds from step 718 to step 720.

In some embodiments, the receiving step 710, filtering step 712, and measurements steps 714, 716 are repeated multiple times, and the selecting between said first and second frequency bands of step 718 is performed after the second quality indicator exceeds said first quality indicator for a predetermined interval, e.g., a time interval of predetermined duration or a fixed number of signal measurements. This is done to prevent switching of bands in response to a short term or transient change in conditions.

In some embodiments, the selecting is based upon a predetermined threshold. For example, the selecting can include: selecting the frequency band corresponding to the lower signal quality value when the first and second signal quality values both exceed said predetermined threshold for a predetermined interval. Thus, when both signal components indicate satisfactory conditions, the lower quality, e.g., lower power, band may be selected freeing the higher power band to be used by another mobile.

Selection may involve selecting the frequency band corresponding to the higher signal quality value when one of said first and second signal quality values is below said predetermined threshold thereby selecting the better band when signal quality is an issue. Selection can also involve selecting the second frequency band when said first signal quality value decreases over time and said second signal quality value increases over time and a difference in the first and second quality values changes sign indicating that the wireless terminal is heading toward the transmitter of the second signal component and away form the first component transmitter.

In some embodiments, the selecting step is a function of a quality of service (QoS) to be provided to the mobile node, e.g., user, said selecting function changing in response to information indicating a change in the QoS to be provided to said user. This change may be implemented as a change in a threshold quality used by said selection module to select a frequency band.

In some embodiments, the selecting step is a function of communication system loading and the method further comprises the mobile node receiving, e.g., from a base station, information indicative of communications system loading and modifying said selecting function in response to an indication in a change in communication system loading. For example, in the case where a wireless terminal detects heavy use of a first frequency band, the selection may alter a weight used in the selection determination to create a stronger preference for the second frequency band.

In step 720, operation is directed based upon whether the first frequency band is selected or the second frequency band is selected. If the first frequency band is selected, then operation proceeds via connecting node A 722 to step 704; however, if the second frequency band is selected, then operation proceeds to step 724.

In step 724, the passband filter is controlled to pass said second band instead of said first band. Operation proceeds from step 724 via connecting node B 726 to step 728.

In step 728, the second base station transmitter, which primarily transmits in the second frequency band is operated to transmit a third signal component in said second frequency band. In step 730, the first base station transmitter or a third base station transmitter, which primarily transmits in the first frequency band is operated to transmit a fourth signal component in said second frequency band. In step 732, the second base station is operated to transmit a signal in said first frequency band. In step 734, the mobile node's receiver is operated to receive a signal including the third signal component and the fourth signal component. Operation proceeds form step 734 to step 736. In step 736, said passband filter in the mobile node is operated to pass the third and fourth signal components being within the second frequency band. In step 738, the mobile node is operated to perform a third signal measurement on said third signal component to generate a third signal quality indicator. In step 740, the mobile node is operated to perform a fourth signal measurement on said fourth signal component to generate a fourth signal quality indicator. Operation proceeds from step 740 to step 742.

In step 742, the mobile node is operated to select between operating in the first frequency band and operating in the second frequency band as a function of said third and fourth signal quality indicators. Operation proceeds from step 742 to step 744.

In step 744, operation proceeds based upon whether the first or the second frequency band is selected. If the second frequency band is selected, operation proceeds from step 744 via connecting node C 748 to step 728. However, if the first frequency band is selected, then operation proceeds from step 744 to step 746, where the passband filter in the mobile node is controlled to pass said first frequency band instead of said second frequency band. Operation proceeds from step 746 via connecting node A 722 to step 704.

FIGS. 7-12 are used to illustrate exemplary signals and band selection by an exemplary wireless terminal receiver in accordance with the present invention.

Figure 7:
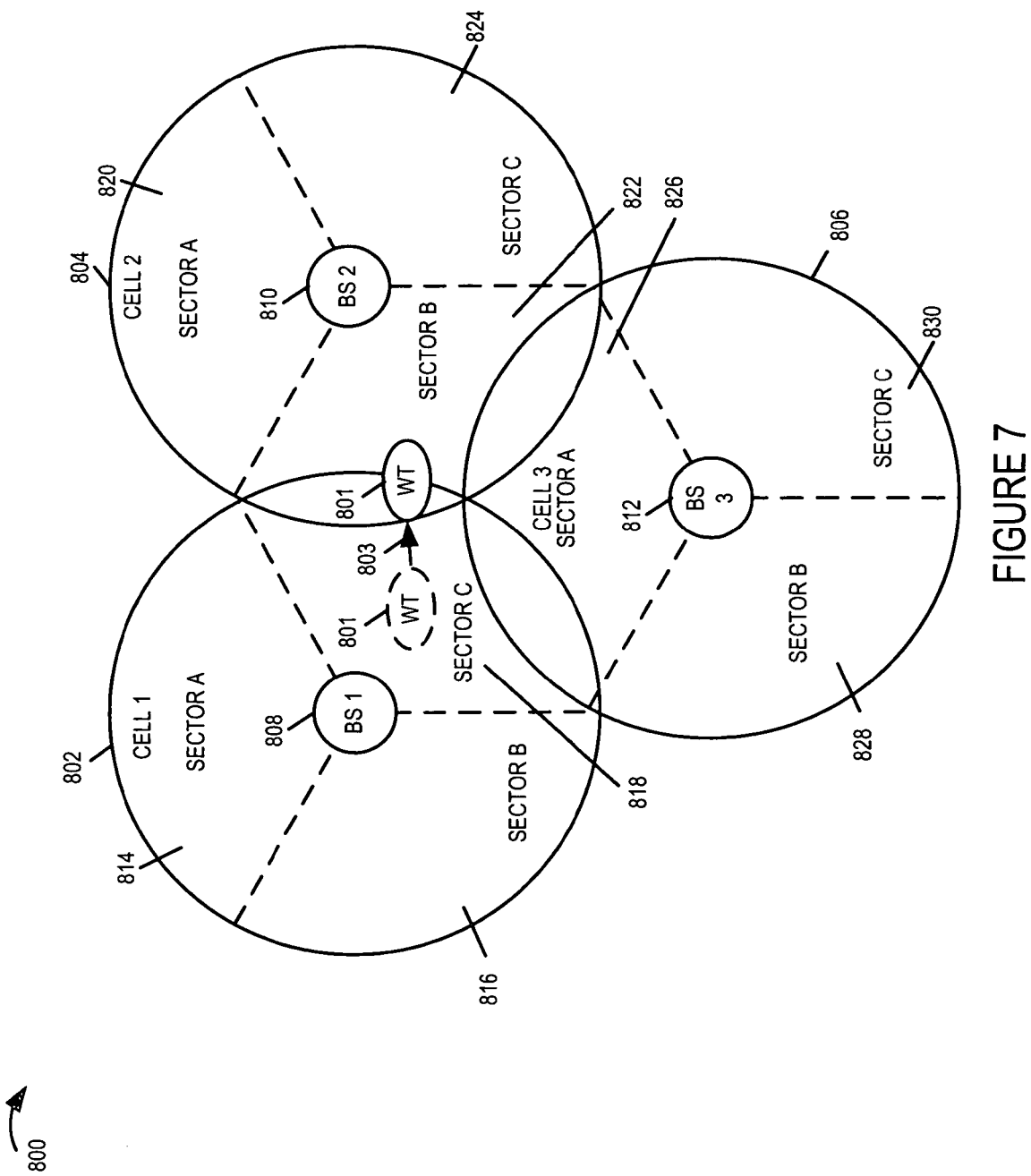
FIG. 7 is a drawing of a portion of an exemplary wireless communications systems implemented in accordance with the invention, the system including an exemplary wireless terminal in motion and is used for purposes of further explaining the invention.

FIG. 7 shows a portion of an exemplary wireless communications system 800, supporting multiple carriers and spread spectrum OFDM signaling, implemented in accordance with the present invention. System 800 may be an exemplary embodiment of system 100 of FIG. 1. FIG. 7 includes a plurality of exemplary multi-sector cells, cell 1 802, cell 2 804, cell 3 806. Each cell (802, 804, 806) represents a wireless coverage area for a base station (BS), (BS1 808, BS2 810, BS 3 812), respectively. BSs 808, 810, 812, may be exemplary embodiments of BS 200 of FIG. 2. The BSs 808, 810, 812, are coupled together via a network and coupled to other network nodes and the Internet. In the exemplary embodiment, each cell 802, 804, 806 includes three sectors (A, B, C). Cell 1 802 includes sector A 814, sector B 816, and sector C 818. Cell 2 804 includes sector A 820, sector B 822, and sector C 824. Cell 3 806 includes sector A 826, sector B 828, and sector C 830. FIG. 7 also includes an exemplary WT 801, implemented in accordance with the present invention. WT 801 may be an exemplary embodiment of WT 300 of FIG. 3. Exemplary WT 801's current point of attachment is the sector 3 818 transmitter of BS 1 808. The WT 801 is moving toward BS 2 810 as indicated by arrow 803.

Figure 8:
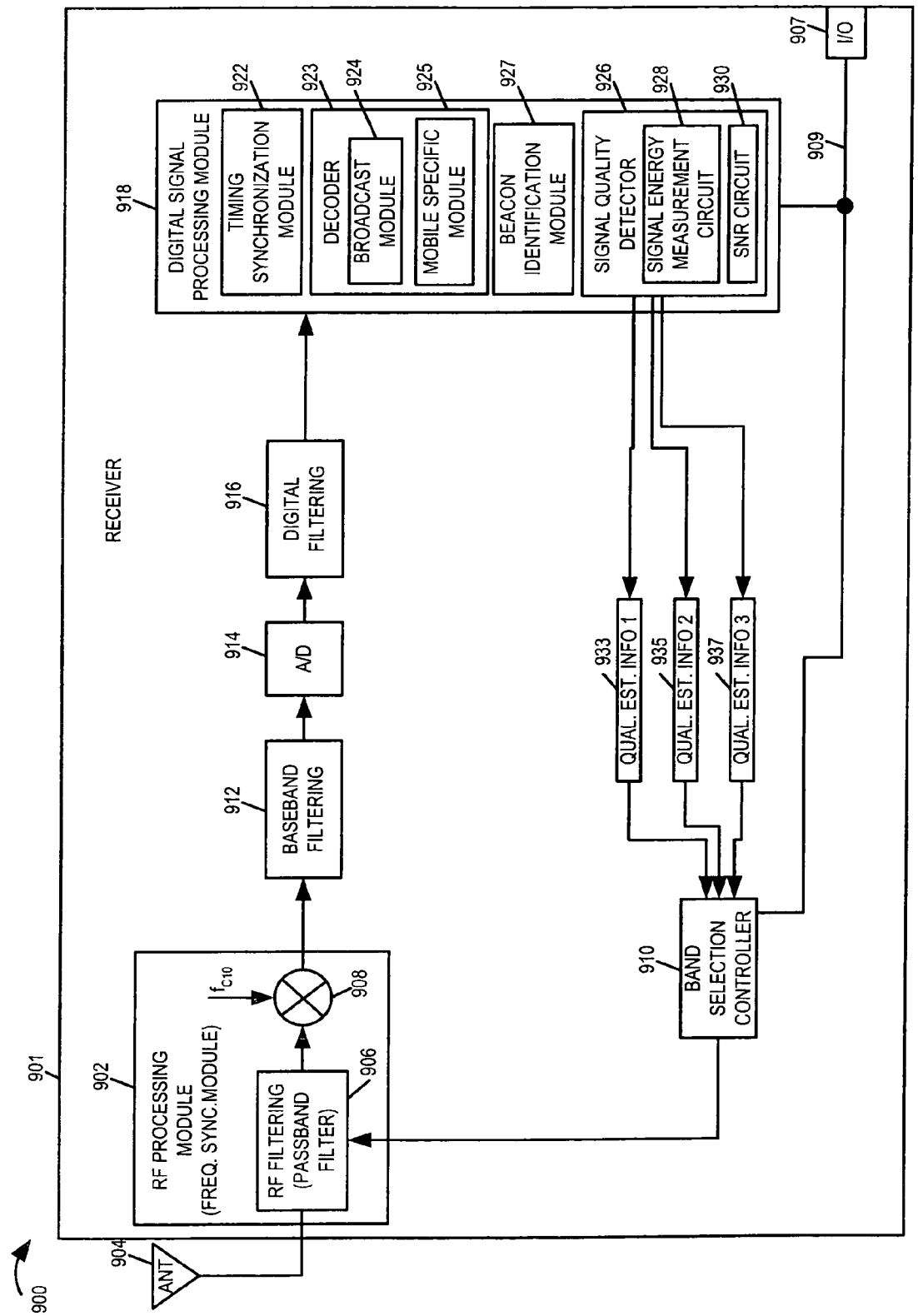
FIG. 8 is a drawing of another exemplary embodiment of a receiver implemented in accordance with the present invention, the receiver may be used in the wireless terminal shown in FIG. 7.

FIG. 8 is example of an exemplary wireless terminal receiver 901/antenna 902 combination 900 implemented in accordance with the present invention. The receiver/antenna combination 900 of FIG. 8 may be used as the receiver 302/antenna 312 combination in the WT 300 of FIG. 3 or the WT 801 of FIG. 7. Receiver 901 illustrates an exemplary embodiment of a receiver, in accordance with the invention, that can process multiple components of a received signal included in the same selected carrier band, each component conveying different information, e.g., information corresponding different carrier bands transmitted by different transmitters and/or different transmit antennas. The FIG. 8 embodiment is well suited where both signal components are communicated using the same technology, e.g., same type of modulation.

The receiver 901 of FIG. 8 uses a single RF processing chain which includes a single RF processing module (frequency synchronization module) 902. The receiver 901 is coupled to an antenna 904 which receives downlink signals from a plurality of sector/cell base station transmitters. The antenna 904 is coupled to the RF processing module 902. The RF processing module 902 includes a controllable RF filter 906 and a mixer circuit 908. The RF filter 906 may be implemented as a passband filter and serves as a frequency synchronization circuit. The RF processing module 902 has been tuned to a carrier frequency selected by a band selection controller 910. The RF filter passes received signal components within the selected carrier band and rejects at least some signal components outside the selected carrier band.

The received passband signal from the antenna 904 is input to the RF filter 906 and processed by a mixer circuit 908 resulting in a baseband signal. The resulting baseband signal is output from the RF processing module 902 and input to a baseband filter 912. The filtered output from the baseband filter 912 is input to an A/D convertor module 914, where analog to digital conversion is performed. The resulting output digital signal is input to a digital filter 916 for additional filtering. Then the output of the digital filter 916 is input to a digital signal processing module 918. The digital signal processing module 918 includes a timing synchronization module 922, a decoder 923, a beacon identification module 927, and a signal quality detector 926. Thus digital signal processing module 918 is capable of fully decoding broadcast as well as WT specific information, e.g., information intended for the individual WT and not other WTs.

The timing synchronization module 922 is used for timing synchronization of received data being processed, e.g., received downlink signals. The timing synchronization module 922 may implemented as a symbol timing recovery circuit using known techniques. The decoder 923 includes a broadcast module 924 for decoding received broadcast signals, e.g., assignment signals, pilot signals, etc., and a mobile specific module 925 for decoding received downlink data/information, e.g., downlink traffic signals, intended for the specific WT 300 (or WT 801) to which receiver 901 belongs.

The beacon identification module 927 identifies a received beacon signal being processed with a specific base station sector transmitter associated with a specific carrier frequency used for its primary downlink signaling. Each beacon signal may be, e.g., a signal occupying single OFDM symbol time with the total or nearly total sector transmitter energy concentrated on the one tone. Because of the characteristics of the OFDM beacon signals, the beacon identification module 927 can identify beacon signals, without having to process the signals through the timing synchronization module 922 or the decoder module 923.

The signal quality detector 926 includes a signal energy measurement circuit 928 and a SNR circuit 930. The signal quality detector 926 generates quality estimates for different channels, from a plurality of base station cell/sector transmitters to WT 300 based on measurements of the received identified beacon signals. The quality estimate is based on the signal energy measurement circuit 928 output and/or the SNR circuit 930 output which is a function of measured signal energy. Signal quality estimate information 933, 935, 937 e.g., quality indicator values, corresponding to each received identified beacon is forwarded to the band selection controller 910 to be used in making a band selection decision.

The signal component quality information (933, 935, 937) forwarded from the digital signal processing module 918 is used by the band selection controller 910 to make decisions concerning the settings of the carrier frequency band to be used by RF processing module 902, e.g., which band and thus, which base station sector transmitter, should be selected for receiving downlink communications.

Receiver 901 of FIG. 8 includes an I/O interface 907 coupled to digital signal processing module 918 and the band selection controller 910 via bus 509 over which the various elements may interchange data and information. In other embodiments, bus 509 may be coupled to other receiver components, e.g., digital filter 916. The receiver 901 may communicate with other elements of the WT 300 via I/O interface 907 which couples receiver 901 to bus 312. Decoded downlink traffic channel signals may be conveyed via interface 907, e.g., to one or more external devices such as a display and/or other WT components.

In FIG. 8, the output of band selection controller 910 is used to control the RF processing module 902. In other embodiments, the band selection controller 910 may be coupled to the digital filter 916 and/or the digital signal processing module 918, and the output of the band selection controller 910 can be used to control the digital filtering 916 and/or the digital signal processing module 918. In such cases, the RF processing module 902 receives and passes a wide portion of the received signal, e.g., multiple bands, and the digital filtering 916 and/or the digital signal processing module 918 selects a part of the received signal to further process and filter or discard the remaining part of the received signal in accordance with a control signal or signals received from the band selection controller 910.

Figure 9:
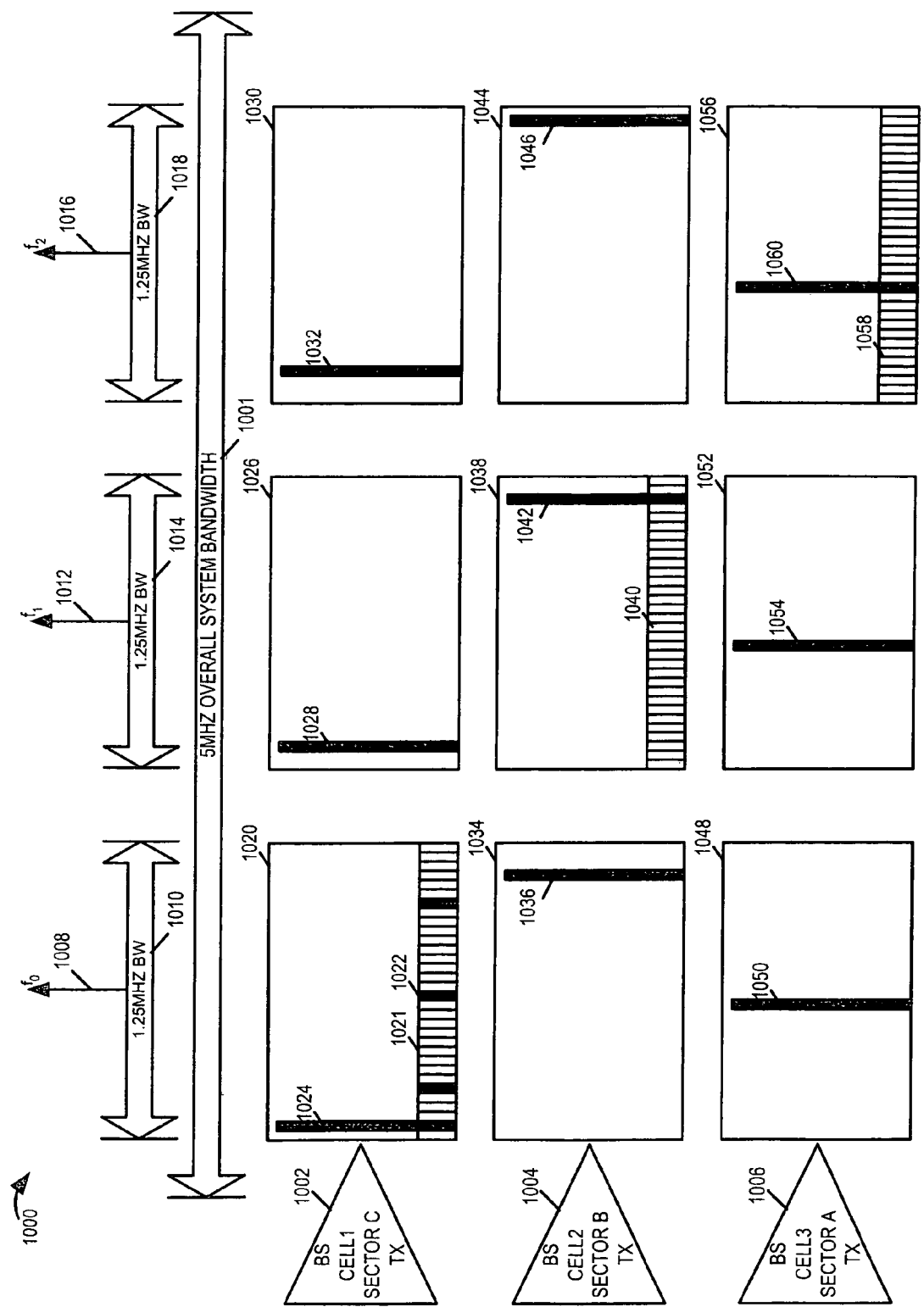
FIG. 9 is a drawing illustrating exemplary base station sector transmitter signaling including beacons corresponding to a sector transmitter, the beacons being transmitted into multiple bands in accordance with the present invention; the signaling may be transmitted from the exemplary base stations shown in FIG. 7.

FIG. 9 is a drawing 1000 illustrating exemplary transmitter signaling, in accordance with the invention. Assume that there is an exemplary wireless terminal, e.g., WT 801, in the exemplary three sectors per cell multi-cell wireless communications system 800 of FIG. 7 using an overall system BW of 5 MHz 1001. Assume the wireless terminal 801, e.g., a mobile node in motion, is currently situated in the system 800 such that it can receive: some signals from a BS cell 1 sector C transmitter 1002, some signals from a BS cell 2 sector B transmitter 1004, and some signals from a BS cell 3 sector transmitter 1006. Assume that the WT 801 was previously closest to transmitter 1002, but is now closest to transmitter 1004.

BS cell 1 sector C transmitter 1002 transmits downlink signals 1020 using carrier frequency $f_0$ 1008 within a 1.25 MHz BW band 1010. Signals 1020 include downlink traffic channel signals 1021 for WTs which are represented by small rectangles, and a beacon signal 1024 represented by a large shaded rectangle. Beacon signals have been depicted larger in size than ordinary signals to illustrate that beacon signals have a much higher transmission energy concentration on a per tone basis than an ordinary signal making such signals easy to detect. Downlink traffic signals 1022, e.g., a spread spectrum OFDM signal, intended for the specific WT of interest 801 have been shaded. In addition, BS cell 1 sector C transmitter 1002 transmits downlink signals 1026 into a 1.25 MHz frequency band 1014 with carrier frequency $f_1$ 1012. Downlink signals 1026 include a beacon signal 1028. BS cell 1 sector C transmitter 1002 also transmits downlink signals 1030 into a 1.25 MHz frequency band 1018 with carrier frequency $f_2$ 1016. Downlink signals 1030 include a beacon signal 1032. In this exemplary embodiment, the beacon signals (1024, 1028, 1032) and the ordinary signaling (1021) are transmitted by transmitter 1002 at different times. Most of the time, transmitter 1002 transmits ordinary downlink signaling 1021, but occasionally, e.g., periodically, transmitter 1002 transmits a beacon signal (1024, 1028, or 1032) in place of the ordinary signaling, with the total or nearly total sector transmission power being concentrated on the beacon signal. The timing sequence can be structured such that the transmitter 1002 cycles through beacons 1024, 1028, 1032, repetitively.

BS cell 2 sector B transmitter 1004 transmits downlink signals 1038 using carrier frequency $f_1$ 1012 within the 1.25 MHz BW band 1014. Signals 1038 include downlink traffic signals 1040 for WTs which are represented by small rectangles, and a beacon signal 1042 represented by a large shaded rectangle. In addition BS cell 2 sector B transmitter 1004 transmits downlink signals 1034 into frequency band 1010. Downlink signals 1034 include a beacon signal 1036. BS cell 2 sector B transmitter 1004 also transmits downlink signals 1044 into frequency band 1018. Downlink signals 1044 include a beacon signal 1046. In this exemplary embodiment, the beacon signals (1036, 1042, 1046) and the ordinary signaling (1040) are transmitted by transmitter 1004 at different times. Most of the time, transmitter 1004 transmits ordinary downlink signaling 1040, but occasionally, e.g., periodically, transmitter 1004 transmits a beacon signal (1036, 1042, or 1046) in place of the ordinary signaling, with the total or nearly total sector transmission power being concentrated on the beacon signal. The timing sequence can be structured such that the transmitter 1004 cycles through beacons 1036, 1042, 1046, repetitively.

BS cell 3 sector A transmitter 1006 transmits downlink signals 1056 using carrier frequency $f_2$ 1016 within the 1.25 MHz BW band 1018. Signals 1056 include downlink traffic signals 1058 for WTs which are represented by small rectangles, and a beacon signal 1060 represented by a large shaded rectangle. In addition BS cell 3 sector A transmitter 1006 transmits downlink signals 1048 into frequency band 1010. Downlink signals 1048 include a beacon signal 1050. BS cell 3 sector A transmitter 1006 also transmits downlink signals 1052 into frequency band 1014. Downlink signals 1052 include a beacon signal 1054. In this exemplary embodiment, the beacon signals (1050, 1054, 1060) and the ordinary signaling (1058) are transmitted by transmitter 1006 at different times. Most of the time, transmitter 1006 transmits ordinary downlink signaling 1058, but occasionally, e.g., periodically, transmitter 1006 transmits a beacon signal (1050, 1054, or 1060) in place of the ordinary signaling, with the total or nearly total sector transmission power being concentrated on the beacon signal. The timing sequence can be structured such that the transmitter 1006 cycles through beacons 1050, 1054, 1060, repetitively.

In this exemplary embodiment, each of the beacon signals (1024, 1028, 1032, 1036, 1042, 1046, 1050, 1054, 1060) are transmitted at the same transmission power level. In other embodiments, different transmission power levels may be used for different beacon signals, provided the WTs know the transmission power assigned to each beacon signal or know the relationships between the transmission power levels assigned to different beacon signals.

Figure 10:
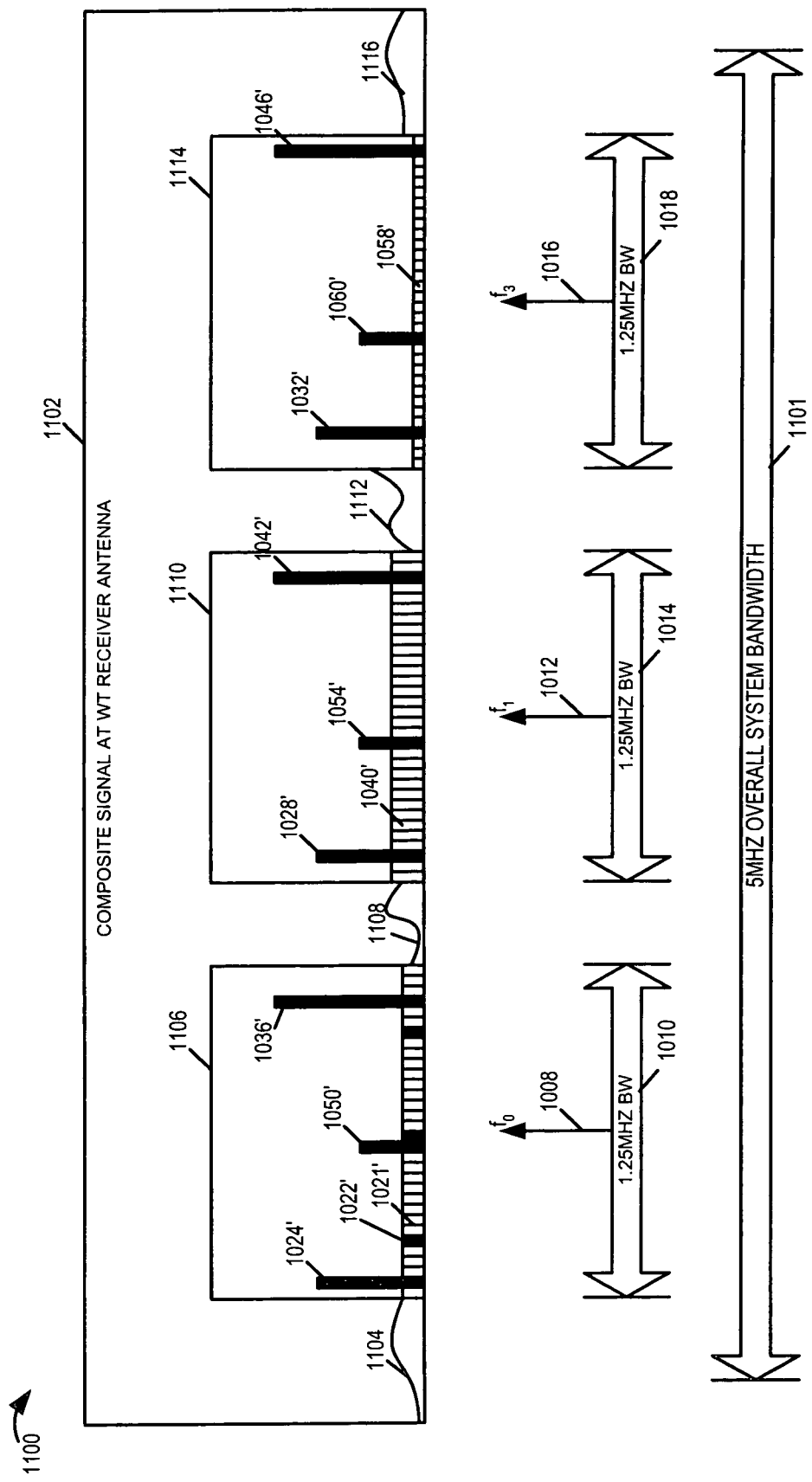
FIG. 10 is a drawing illustrating an exemplary received signal at the receiver of the exemplary wireless terminal shown in FIG. 7.

FIG. 10 is a drawing 1100 illustrating an exemplary composite signal 1002 at the receiver antenna of WT receiver 801 and associated frequency information. Signal 1102 include components 1104, 1106, 1108, 1110, 1112, 1114, and 1116. Components 1104, 1108, 1112, and 1116 represent noise signals outside the frequency bands of interest 1010, 1014, 1018.

Signals 1106 represents a composite received copy of signals 1020, 1034, and 1048 which were transmitted within band 1010 with carrier frequency $f_0$ 1008; signal 1106 also includes additional noise. Transmitted beacon signal 1024 and ordinary signaling 1021, 1022 have been moderately reduced in amplitude, e.g., due to channel gain, resulting in received signals (1024', 1021', 1022'). Transmitted beacon signal 1036 has been slightly reduced in amplitude, e.g., due to channel gain, resulting in received beacon signal 1036'. Beacon signal 1050 has been significantly reduced in amplitude, e.g., due to channel gain, resulting in received beacon signal 1050'. Similar to what is described with respect to FIG. 9, signals 1024', 1022' and 1021', 1050', and 1036' of FIG. 10 may be received at different time instants.

Signals 1110 represents a composite received copy of signals 1026, 1038, 1052 which were transmitted within band 1014 with carrier frequency $f_1$ 1012; signal 1110 also includes additional noise. Transmitted beacon signal 1042 and ordinary signaling 1040, have been slightly reduced in amplitude, e.g., due to channel gain, resulting in received signals (1042', 1040'). Transmitted beacon signal 1028 has been moderately reduced in amplitude, e.g., due to channel gain, resulting in received beacon signal 1028'. Transmitted beacon signal 1054 has been significantly reduced in amplitude, e.g., due to channel gain, resulting in received beacon signal 1054'.

Signals 1114 represents a composite received copy of signals 1030, 1044, 1056 which were transmitted within band 1018 with carrier frequency $f_2$ 1016; signal 1114 also includes additional noise. Transmitted beacon signal 1060 and ordinary signaling 1058, have been significantly reduced in amplitude, e.g., due to channel gain, resulting in received signals (1060', 1058'). Transmitted beacon signal 1032 has been moderately reduced in amplitude, e.g., due to channel gain, resulting in received beacon signal 1032'. Transmitted beacon signal 1046 has been slightly reduced in amplitude, e.g., due to channel gain, resulting in received beacon signal 1046'.

Figure 11:
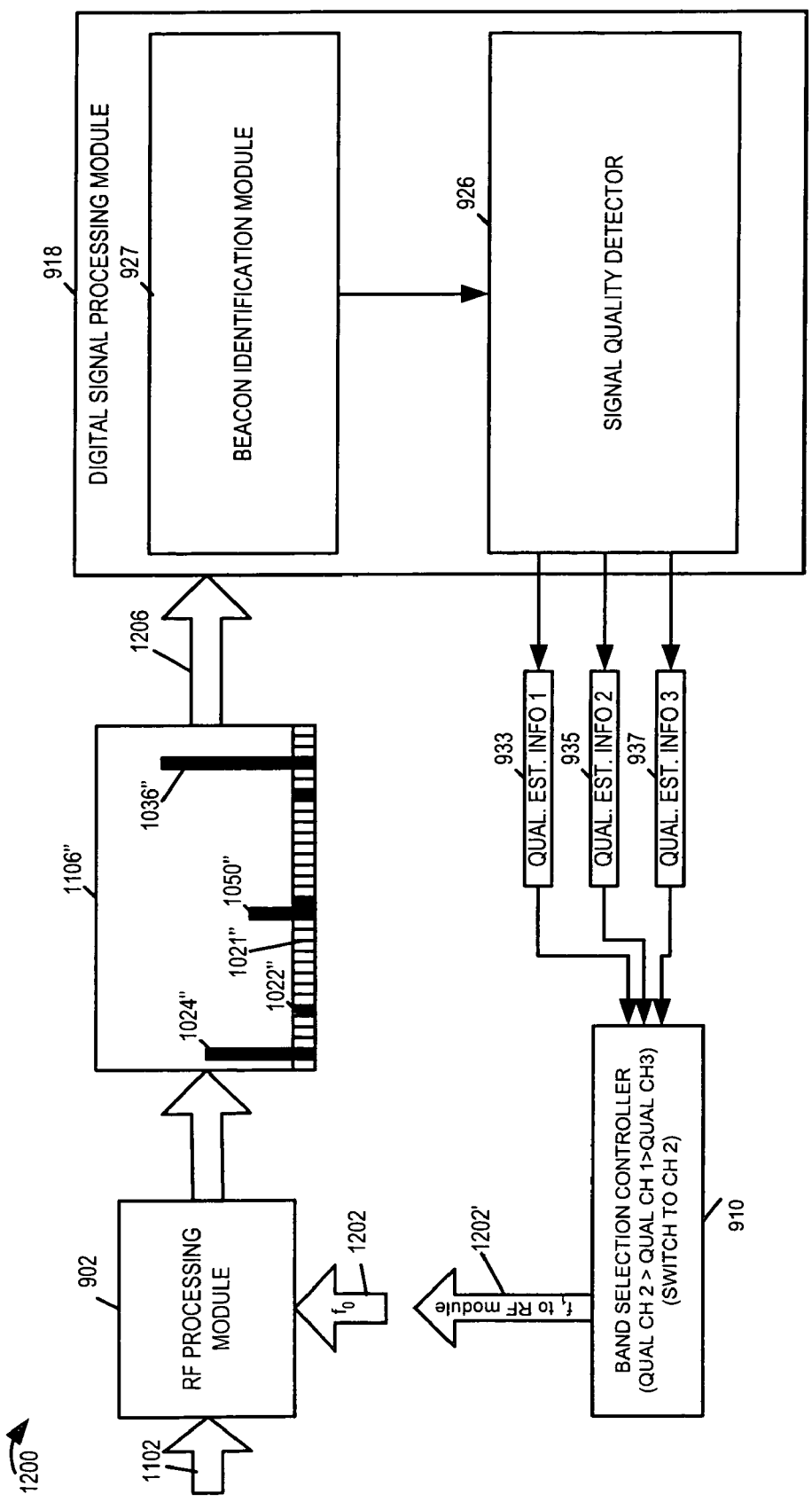
FIG. 11 is a drawing illustrating exemplary wireless terminal receiver processing of the exemplary received signal of FIG. 10, and exemplary band selection in accordance with the present invention.

FIG. 11 is a drawing 1200 illustrating exemplary processing by receiver 900 of FIG. 8 of exemplary composite received signal 1102 of FIG. 10 in accordance with the present invention. WT 801 including receiver 900 is currently attached to BS 1 sector 3 using transmitter 1002 for downlink traffic signaling, and therefore RF processing module 902 is being controlled by signal 1202 from band controller 910 to select band 1010 with carrier frequency $f_0$ 1008. RF processing module 902 extracts baseband signal 1106' from signal 1102, a filtered representation of the information included in signals 1106. Signals 1106' includes ordinary signaling 1021", ordinary signaling directed specifically for WT 801 1022", and beacon signals 1024", 1036", 1050", corresponding to signals (1021', 1022', 1024', 1036', 1050'), respectively.

Arrow 1206 represents additional processing, e.g., baseband filtering, A/D conversion, and digital filtering, by the receiver chain components 912, 914, 916. Then, the signals are input to the digital signal processing module 918. Beacon identification module 927 identifies beacon signal 1024" as being associated with cell 1 sector C transmitter 1002 which uses carrier frequency $f_0$ 1008 and band 1010 as its assigned band for downlink traffic channel communications. Beacon identification module 927 identifies beacon signal 1036" as being associated with cell 2 sector B transmitter 1004 which uses carrier frequency $f_1$ 1012 and band 1014 as its assigned band for downlink traffic channel communications. Beacon identification module 927 identifies beacon signal 1050" as being associated with cell 3 sector A transmitter 1006 which uses carrier frequency $f_2$ 1016 and band 1018 as its assigned band for downlink traffic channel communications.

The identified beacon information and the beacon signals 1024", 1036", and 1050" as forwarded to the signal quality detector 926, where energy content and/or SNR information are obtained and quality estimation information (933, 935, 937) corresponding to the beacons signals (1024", 1036", 1050") is generated. In this OFDM embodiment, the beacon identification, beacon signal measurements, and signal quality information generation are performed without using a timing synchronization module or having to decode modulated information from the beacon signal. In other embodiments, information may be modulated on the beacons signals, and a broadcast decode module may be used. In addition, in other embodiments, additional information may be considered in generating the quality estimation values. For example, error rates on decoded information from received ordinary signals 1022", e.g., downlink traffic channel signals intended for specific WT 801, may be considered when evaluating the quality of the channel corresponding to beacon signal 1024". In addition, where different detected beacon signals may correspond to the same carrier, e.g., from another cell, ratios between the beacon signals may be used in determining interference levels.

Quality estimate information 1 933 is based on the energy and/or SNR estimates of the processed beacon signal 1024", and corresponds to transmitter 1002 using carrier frequency $f_0$. Quality estimate information 2 935 is based on the energy and/or SNR estimates of the processed beacon signal 1036", and corresponds to transmitter 1004 using carrier frequency $f_1$. Quality estimate information 1 937 is based on the energy and/or SNR estimates of the processed beacon signal 1050", and corresponds to transmitter 1006 using carrier frequency $f_2$.

Band selection controller receives information 933, 935, and 937, decides that the quality of channel 2 is better than the quality of channel 1 which is better than the quality of channel 3 and that WT 801 should change its attachment point. At the appropriate time, e.g., to minimize disruption in service, band selection controller 910 sends signal 1202' to RF processing module 902 to change the selection to frequency $f_1$.

Figure 12:
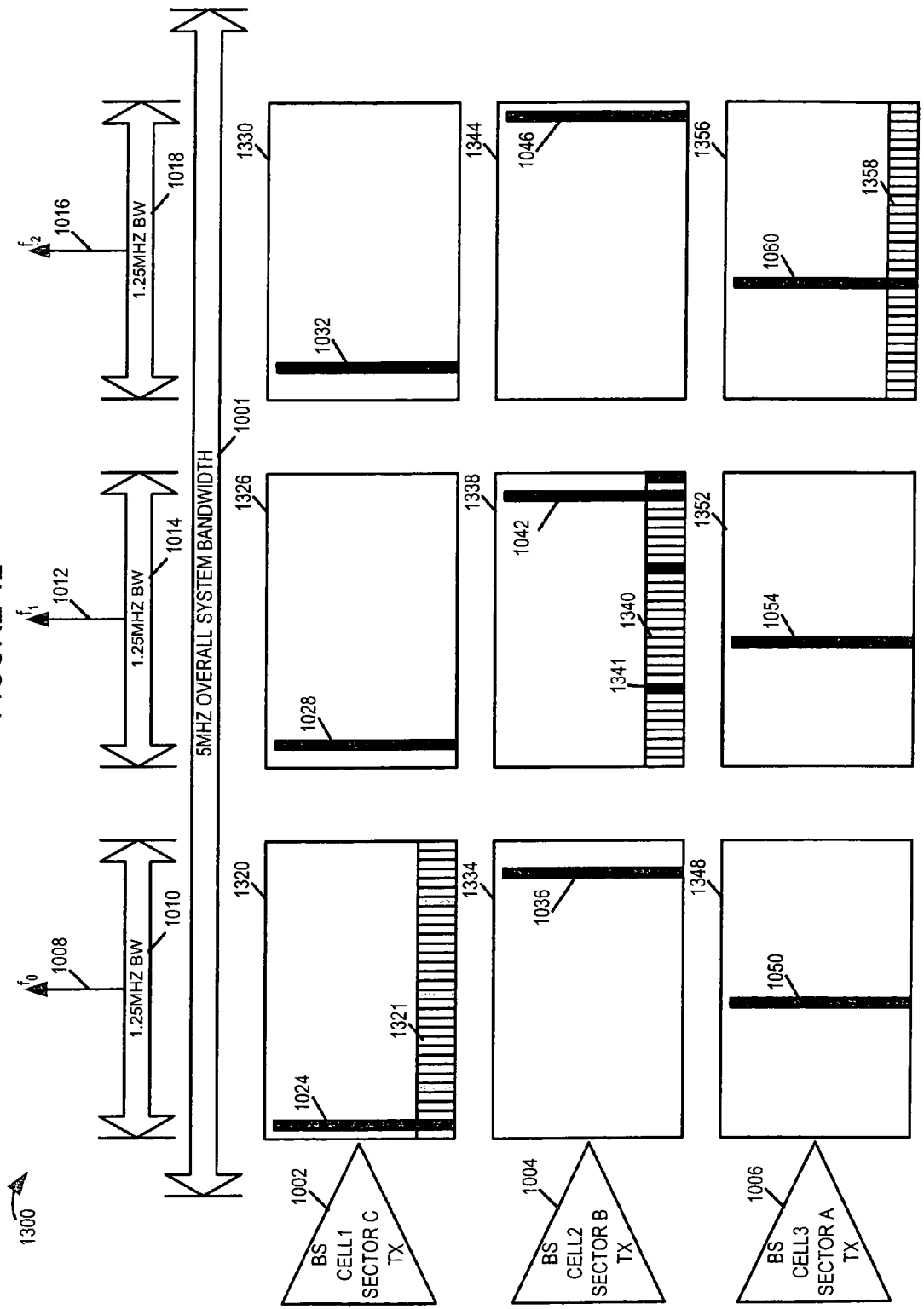
FIG. 12 is a drawing illustrating exemplary base station sector transmitter signaling including beacons corresponding to a sector transmitter, the beacons being transmitted into multiple bands in accordance with the present invention, the signaling may be transmitted from the exemplary base stations shown in FIG. 7 after the wireless terminal has selected a new band and changed the attachment point.

FIG. 12 is a drawing 1300 illustrating exemplary transmitter signaling after the WT 801 has changed it band selection and attachment point. The WT 801 can receive some signals from: BS cell 1 sector C transmitter 1002, some signals from BS 2 sector B transmitter 1004, and some signals from BS 3 sector transmitter 1006. Assume that the WT 801 was previously closest to transmitter 1002, but is now closest to transmitter 1004.

BS cell 1 sector C transmitter 1002 transmits downlink signals 1320 using carrier frequency $f_0$ 1008 within band 1010. Signals 1320 include downlink traffic signals traffic signals 1321 for WTs which are represented by small rectangles, and a beacon signal 1024 represented by a large shaded rectangle. In addition BS cell 1 sector C transmitter 1002 transmits downlink signals 1326 into frequency band 1014 with carrier frequency $f_1$ 1012. Downlink signals 1326 include a beacon signal 1028. BS cell 1 sector C transmitter 1002 also transmits downlink signals 1330 into frequency band 1018 with carrier frequency $f_2$ 1018. Downlink signals 1330 include a beacon signal 1032.

BS cell 2 sector B transmitter 1004 transmits downlink signals 1338 using carrier frequency $f_1$ 1012 within band 1014. Signals 1338 include downlink traffic signals traffic signals 1340 for WTs which are represented by small rectangles including downlink traffic signals for specific WT 801 1341 represented by small rectangles with shading, and a beacon signal 1042 represented by a large shaded rectangle. In addition BS cell 2 sector B transmitter 1004 transmits downlink signals 1334 into frequency band 1010. Downlink signals 1034 include a beacon signal 1036. BS cell 2 sector B transmitter 1004 also transmits downlink signals 1344 into frequency band 1018. Downlink signals 1344 include a beacon signal 1046.

BS cell 3 sector A transmitter 1006 transmits downlink signals 1356 using carrier frequency $f_2$ 1016 within band 1018. Signals 1356 include downlink traffic signals traffic signals 1358 for WTs which are represented by small rectangles, and a beacon signal 1060 represented by a large shaded rectangle. In addition BS cell 3 sector A transmitter 1006 transmits downlink signals 1348 into frequency band 1010. Downlink signals 1348 include a beacon signal 1050. BS cell 3 sector A transmitter 1006 also transmits downlink signals 1352 into frequency band 1014. Downlink signals 1352 include a beacon signal 1054.

Figure 13:
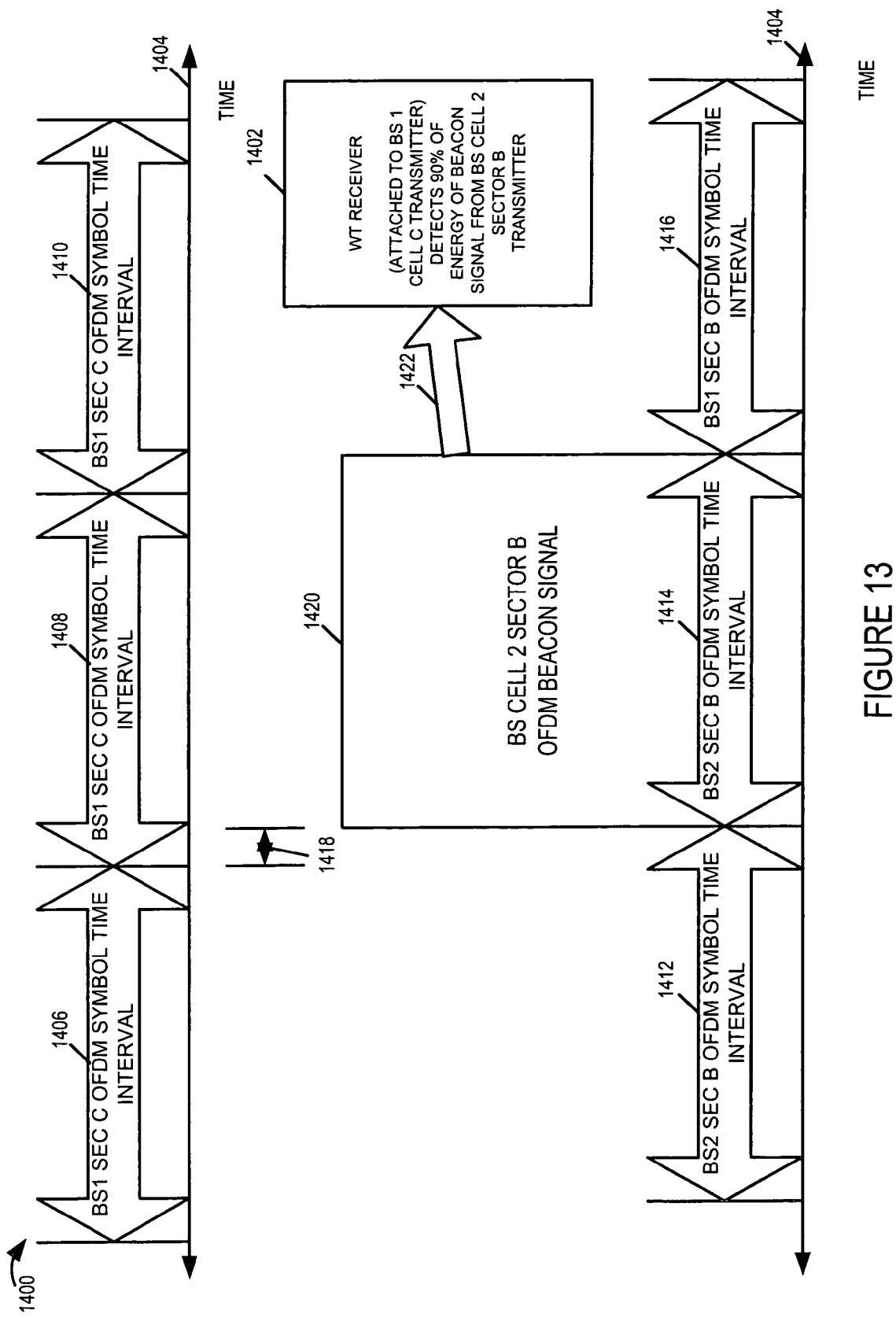
FIG. 13 is an illustration of an exemplary beacon signal with a timing offset with respect to an adjacent sector, used for the purposes of further explaining features of the invention.

FIG. 13 is a drawing 1400 of an exemplary beacon signal 1420 with a timing offset 1418 with respect to an adjacent sector, illustrated for the purposes of further explaining features of the invention. FIG. 13 includes an exemplary WT 1402 implemented in accordance with the present invention, e.g., WT 801 of FIG. 7. Assume that the exemplary system is an OFDM spread spectrum frequency hopped system, using beacon signaling in accordance with the present invention. Assume that time line 1404 represents time at the WT receiver 1402, that the WT 1402 is currently attached to BS 1 sector C transmitter, whose carrier frequency band is currently being used for downlink traffic channel signaling, and that the WT 1402 has synchronized OFDM symbol timing with respect to the BS1 sector C transmitter. Three successive OFDM symbol time intervals (1406, 1408, 1410) are shown for BS 1 sector C transmitter communications. Similarly, three successive OFDM symbol time intervals (1412, 1414, 1416) are shown for BS 2 sector B transmitter communications. Each OFDM symbol time interval (1406, 1408, 1410, 1412, 1414, 1416) is approximately the same duration; however, there is a 10% offset 1418 between the start of a BS 1 sector C OFDM symbol time interval and the start of a BS 2 sector B OFDM symbol time interval. This timing offset could be due, e.g., to differences between the base station timing generators such as different precise start times and/or differences due to different distances between WT 1402 and each base station transmitter.

BS cell 2 sector B OFDM beacon signal 1420 has been communicated to WT 1402 as indicated by arrow 1422. During time interval 1414 BS cell 2 sector B OFDM beacon signal 1420 is present at the WT receiver 1402. However, since the WT is attached and synchronized with respect to BS 1 sector C transmitter, WT 1402 only detects 90% of the energy of the beacon signal 1420, e.g., it misses the last 10% of the signal. However, this relatively high level of energy detection and relatively small amount of associated uncertainty is, in many cases, satisfactory with regard to supporting a comparison of beacon signals from adjacent cell and or sectors. In accordance, with the invention, in many OFDM embodiments, the receiver does not need to resynchronize the receiver with respect to timing for each beacon signal being processed.

Figure 14:
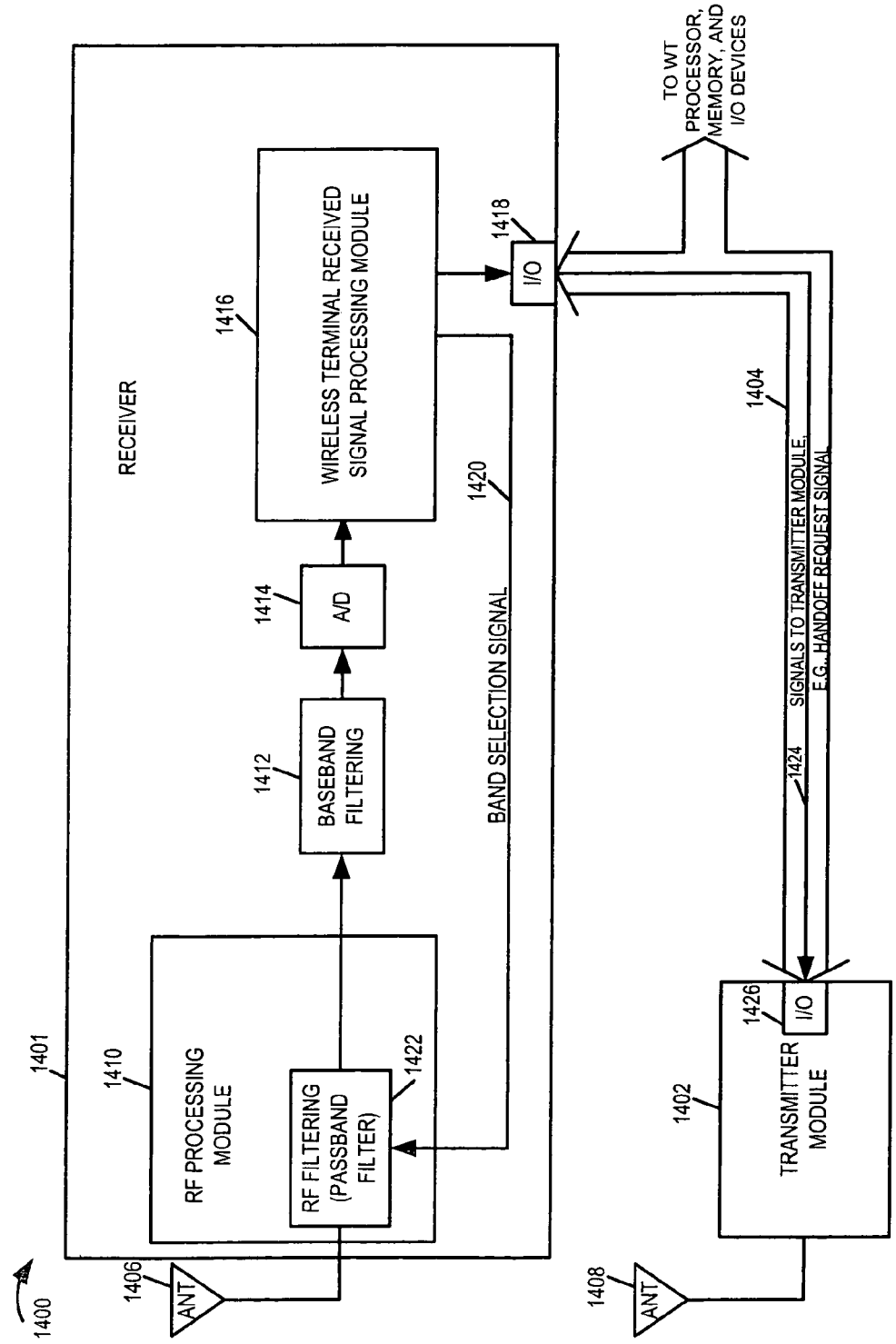
FIG. 14 is an illustration of a wireless terminal and various elements included in the wireless terminal related to determining the availability of a carrier which can be used and for determining when to initiate a handoff from one carrier frequency to another.

FIG. 14 is a drawing 1400 of an exemplary WT 1400 implemented in accordance with one exemplary embodiment of the present invention. FIG. 14 includes a receiver mobile 1401 and a transmitter mobile 1402 coupled together via a bus 1404. Bus 1404 is also coupled to the WT's processor, memory, and I/O devices over which the various elements may interchange data and information. Receiver 1401 includes an RF processing module 1410, a baseband filtering module 1412, an A/D module 1414, a wireless terminal received signal processing module 1416, and an I/O interface 1418. RF processing module 1410 includes a RF filtering module 1422, e.g., a controllable passband filter. RF processing module 1410 is coupled to receive antenna 1406 over which receiver 1401 can receive a plurality of downlink signal including beacons signals from a plurality of BS sector attachment points, e.g., different cells, different sectors, and/or using different ordinary signaling carriers. The received beacons from transmitters which use other carriers to transmit user data, in accordance with the invention, will fall within the same carrier band to which RF filtering module (passband filter) 1422 is tuned thereby avoiding the need to adjust the RF band to receive beacons from transmitters using other frequency bands for user data transmissions. That is, as discussed above, transmitters transmit beacon signals not only into the frequency band they use to communicate user data but into the frequency bands of neighboring sectors, cells or other carriers used in the same sector. In addition to beacon signals from cells and/or sectors with which the wireless terminal does not have an established communication link, RF processing module 1410 can also receive beacon signals from the network attachment point it is using as the current point of attachment. User data/information and control signaling such as pilots, timing control and power control signals may also be received from the transmitter at the current point of network attachment since these signals will be transmitted in the frequency band to which RF processing module 1410 is set.

Output signals from the RF processing module 1410 serve as the input to the baseband filter 1412 which performs analog filtering. Then the filtered signal is input to an A/D convertor module 1414 where the filtered analog signal is converted into a digital signal which is input to the wireless terminal received signal processing module 1416.

Wireless terminal received signal processing module 1416 received the digital signal, performs a DFT or FFT, performs energy estimation, performs beacon detection, e.g., based on energy levels of tones exceeding a threshold, performs symbol detection, e.g., of ordinary signaling such as assignments, determines the transmitter associated with each detected beacon, evaluates and determines the network attachment point to use based on beacon signal energy comparisons, and initiates handoff requests when it determines a different network attachment point should be used. Band selection signal 1420, output from the wireless terminal received signal processing module 1416, is input to the RF filter 1422 and controls the selection of the carrier band to which receiver 1401 is tuned and the time at which switching occurs.

Signal 1424, e.g., a handoff request to a new BS sector attachment point is sent from wireless terminal received signal processing module 1416 via its I/O interface 1418 over WT bus 1404, into transmitter module I/O interface 1426 when module 1416 determines that a handoff should be performed. The transmitter module 1402 is coupled to a transmit antenna 1408 through which the WT can transmit uplink signals using the current wireless link. The uplink signals can include a request to the current network attachment point, e.g., BS sector, to initiate a handoff to a new network attachment point selected based on a received beacon signal. A band selection control signal output by the wireless terminal received signal processing module 1416 is supplied to the transmitter module 1402. This signal can be used to switch the transmitter and receiver carrier band to the band corresponding to the new BS sector attachment point at the appropriate time, e.g., just prior to a time corresponding to an assigned dedicated uplink segment corresponding to the new carrier frequency that can be used to register with the new attachment point.

Figure 15:
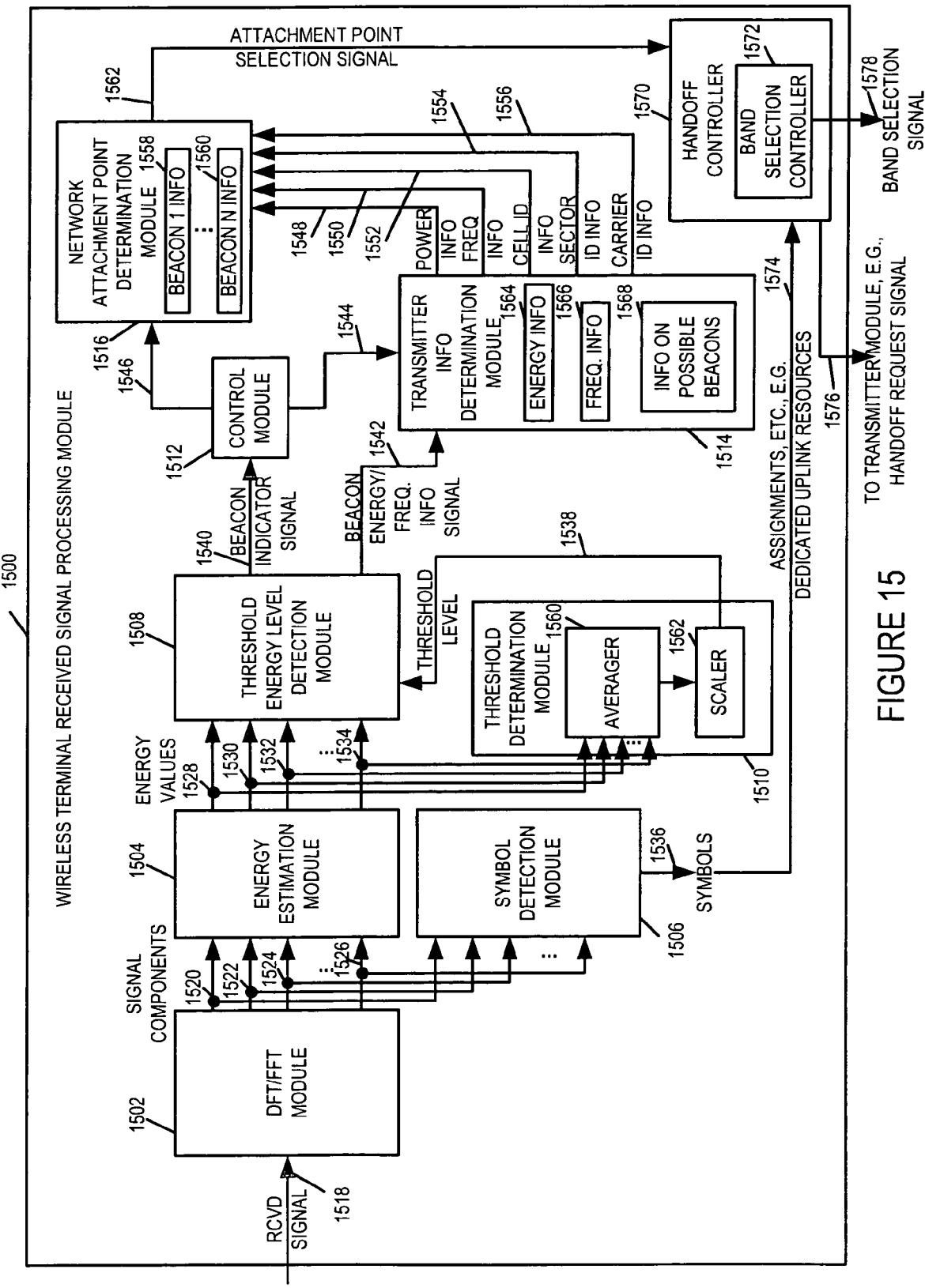
FIG. 15 is an illustration of an exemplary wireless terminal received signal processing module implemented in accordance with the present invention that can be used in the wireless terminal of FIG. 14.

FIG. 15 is a drawing of an exemplary wireless terminal received signal processing module 1500 implemented in accordance with one embodiment of the present invention. WT received signal processing module may be an exemplary embodiment of module 1416 of FIG. 14. The exemplary WT received signal processing module 1500 includes Fourier Transform, e.g., a Discrete Fourier Transform and/or Fast Fourier Transform (DFT/FFT), module 1502, an energy estimation module 1504, a symbol detection module 1506, a threshold energy level detection module 1508, a threshold determination module 1510, a control module 1512, a transmitter information determination module 1514, a network point attachment determination module 1516, and a handoff controller module 1570.

DFT/FFT module 1502 receives as input a received signal 1518, e.g., a signal in a first period of time such as an OFDM symbol transmission time period, said signal including a plurality of signal tones, e.g., 113 tones in one embodiment. Each signal tone corresponding to a different frequency within a downlink frequency band. DFT/FFT module 1502 performs an FFT or DFT on received signal 1518 to generate and output a plurality of separate signal components (1520, 1522, 1524, . . . , 1526), each signal component (1520, 1522, 1524, . . . , 1526) corresponding to a different frequency of the received signal. Thus, module 1502 is used to perform a time to frequency signal transform operation. The output signal components (1520, 1522, 1524, . . . , 1566) from the DFT/FFT module 1502 are input to the energy estimation module 1504 and the symbol detection module 1506.

The energy estimation module 1504 performs an energy estimate on each of the signal components (1520, 1522, 1524, . . . , 1526) generating and outputting a corresponding set of energy values (1528, 1530, 1532, . . . , 1534), each energy estimate corresponding to a different frequency. Symbol detection module 1506 detects and outputs symbols 1536, e.g., modulation symbols conveying user data, e.g., text, audio or video, etc. and/or control data.

Energy values (1528, 1530, 1532, . . . , 1534) are input to a threshold determination module 1510 and threshold energy level detection module 1508. Threshold determination module 1510 includes an averager 1560 and a scaler 1562. Averager 1560 receives the energy values (1528, 1530, 1532, . . . , 1534) and determines an average per frequency energy of the received signal. The output of the averager 1560, is input to the scaler 1562 which scales the determined average energy by a factor greater than four times, e.g., 5, 20, 99, 150 or more times depending on the particular embodiment, generating a threshold level output signal 1538. The threshold level signal 1538 is input to the threshold energy level detection module 1008.

Threshold energy level detection module 1508 compares each of the component energy values (1528, 1530, 1532, . . . , 1534) to the threshold level 1538. When one of the energy value components (1528, 1530, 1532, . . . , 1534) exceeds threshold level 1538, threshold energy level detection module generates and outputs a beacon indicator signal 1540. Detection module 1508 also generates and outputs a beacon energy/frequency information signal 1542 which provides information indicating the frequency of the detected beacon signal component, e.g., tone, and the detected energy level of the tone.

Beacon indicator signal 1540, indicating the presence of a detected beacon signal, is input to control module 1512 triggering a control signal 1544 to the transmitter information determination module 1514 and a control signal 1546 to network attachment point determination module 1516. The controls signals (1544, 1546) initiate action and control beacon processing activity in modules (1514, 1516), respectively, in response to a detected beacon signal.

Transmitter information determination module 1514 includes information about the energy detected in the beacon signal which is stored in energy information 1564, information about the frequency of the detected beacon signal which is stored in frequency information 1566, and info on possible beacons 1568, e.g., stored information about the frequency location at which beacons transmitted by different network attachment points will occur. Transmitter information determination module 1544 receives beacon energy/frequency information signal 1542, stores the energy level corresponding to the received beacon in energy information 1564, and stores the frequency information, e.g., tone identification corresponding to the high energy level, in frequency information 1566. Info on possible beacons 1568, includes, e.g., expected frequency and/or periodicity and transmitter information corresponding to possible beacons. Transmitter information determination module 1514 compares information on the received beacon including frequency information 1566 to information of possible beacons 1568 to determine information about the transmitter which transmitted the beacon signal, e.g., a sector, cell, or carrier frequency used in a sector or cell from which the detected beacon signal was transmitted. The transmitter information determination module 1514 outputs information signals corresponding to the detected beacon signal to the network attachment point determination module 1516. For example, the output information signals may include power information 1548, frequency information 1550, cell identification information 1552, sector identification information 1554, and/or carrier identification information 1556. In some embodiments, at different times beacon signals convey different information.

Network attachment point determination module 1516 includes a plurality of sets of beacon information (beacon 1 information 1558, beacon n information 1560). Each set of beacon information (1558, 1560) corresponding to a received beacon signal and a set of determined information including at least some of power info 1548, frequency information 1550, cell ID info 1552, sector ID info 1554, and carrier ID info 1556 or information derived from info (1548, 1550, 1552, 1554, 1556). The network attachment point determination module 1516 associates each set of beacon information (1558, 1560) with a network attachment point in the communications system, e.g., a specific base station sector transmitter using a particular carrier frequency and its corresponding receiver. The network attachment point determination module 1516 compares beacon information (1558, 1560) for different network attachment points and makes decisions regarding handoffs from one network attachment point to a different network attachment point. Various types of handoffs are possible, in accordance with the present invention, including inter-cell handoffs, inter-sector handoffs, and/or inter-carrier handoffs. For example, in some embodiments, the network attachment point determination module 1516 initiates a handoff request to a different network attachment point when a beacon associated with a different network attachment point has a higher energy value than a beacon associated with the current network attachment point. Numerous variations on the handoff decision process are possible in accordance with the present invention. For example, in some embodiments, beacon energy levels of multiple beacons from a network attachment point can be filtered over time, e.g., averaged, before a comparison is performed to make the handoff determination. In some embodiments, difference margins between current and potential attachment point beacons can be measured and compared to handoff criteria used to determine if a sufficient difference in the power levels exists to justify a handoff. In some embodiments, minimal acceptable beacon energy levels can be used and considered in handoff decisions, e.g., beacons below a preselected energy level are not considered as handoff candidates.

When the network attachment point determination module 1516 decides, based on beacon signal component energy information, to request a handoff to another network attachment point, e.g., in a different cell, in a different sector, or in the same sector using a different carrier, module 1516 sends attachment point selection signal 1562 to a handoff controller 1570. Handoff controller 1570 controls operations of WT regarding the handoff process. Handoff controller 1570 includes a band selection controller module 1572. Handoff controller 1570 receives the attachment point selection signal 1562, e.g., a signal requesting a change in the network attachment point to a new network attachment point corresponding to a detected beacon signal. Corresponding to a received change request, handoff controller 1570 generates a handoff request signal 1576 directed to the transmitter module of the WT. The handoff request signal 1576 is to be transmitted as an uplink signal over the current air link to the current BS sector network attachment point and forwarded to the BS sector network attachment point selected to serve as the new point of network attachment. For an inter-cell handoff request, the forwarding between current and the requested BS sector network attachment point is via a backhaul link, while for an intra-cell inter-sector handoff or intra-sector inter-carrier handoff request, the forwarding and signaling is internal to the BS.

Included in the received detected symbol 1536 are signals of assignments, etc., such as, e.g., assignments by the requested BS sector network attachment point of dedicated resources, e.g., identifiers and/or dedicated uplink segments to the WT to be used in registering with the new network attachment point. The assignments are conveyed to the WT via the current established wireless link. The dedicated uplink segment, e.g., a dedicated access segment being a set of tones during specified OFDM transmission time intervals with respect to the beacon signal corresponding to the requested network attachment point, to be used by the WT, is used in the establishment of a new wireless link to the new network attachment point. For example, in the case of an inter-cell handoff, the dedicated uplink segment is used for sending an uplink timing and/or power control signal to be used by the new BS sector attachment point to generate timing and/or power adjustment signals to be sent to the WT to adjust its uplink signaling.

Handoff controller 1570 receives assignments 1574 of dedicated resources from the new requested BS sector attachment point, uses timing and/or data link framing information corresponding to the new sector attachment point, e.g., information about which tones are used for which types of data during which time slots, and uses the timing relationship between the beacon associated with the new BS sector attachment point and the assigned uplink dedicated segment to decide when to terminate the old wireless link, switch to a new frequency band, assuming the new BS sector attachment point uses a different frequency band than the current BS sector attachment point, and establish a new wireless link with the new BS sector attachment point. Band selection controller 1572 generates band selection signal 1578 at the appropriate time. Band selection signal 1572 is sent to the RF processing module of the single chain receiver to switch bands.

Figures 16, 16A:
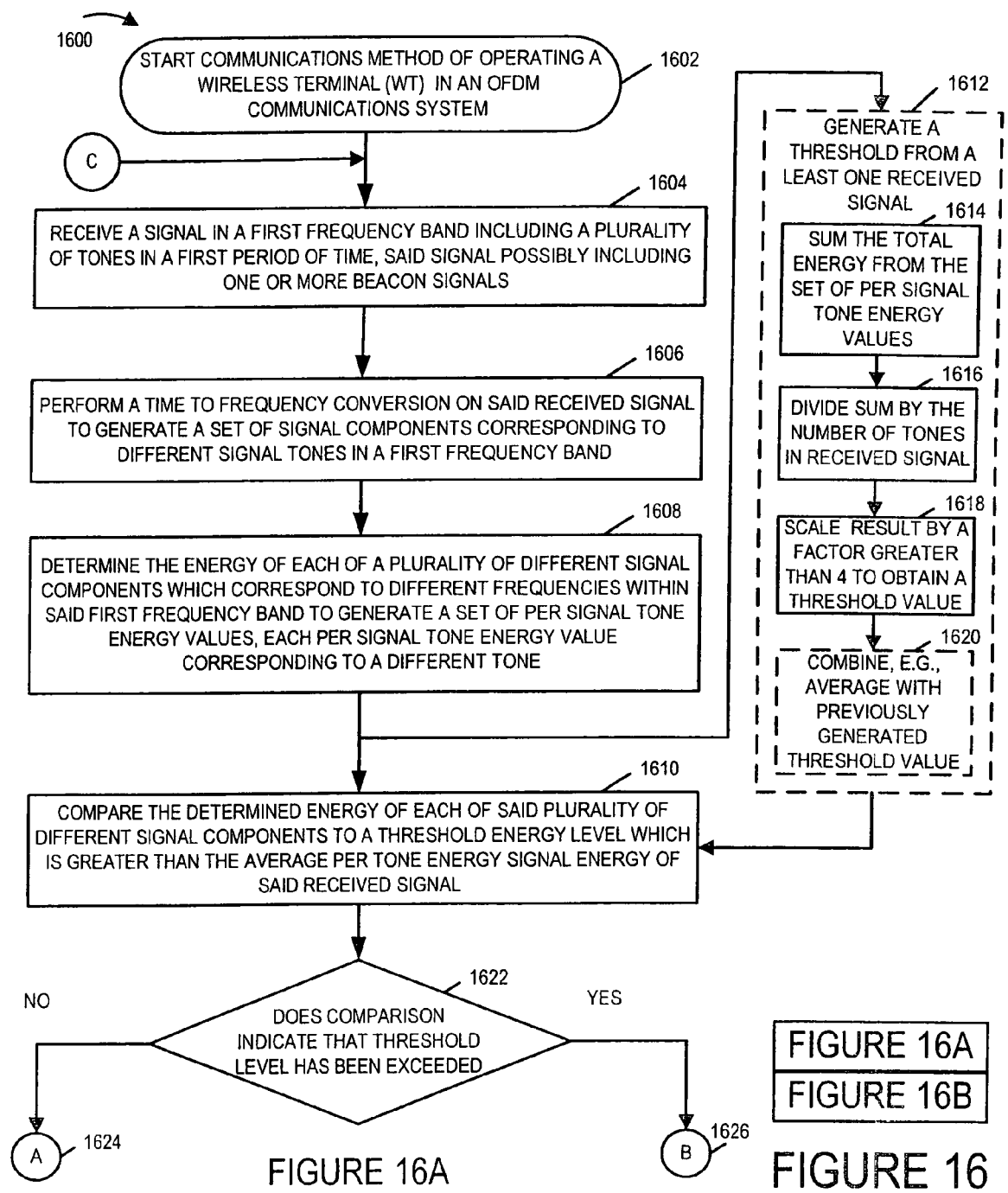
FIG. 16 is a flowchart of an exemplary method of operating a WT in an OFDM communications system in accordance with the present invention.
Figure 16B:
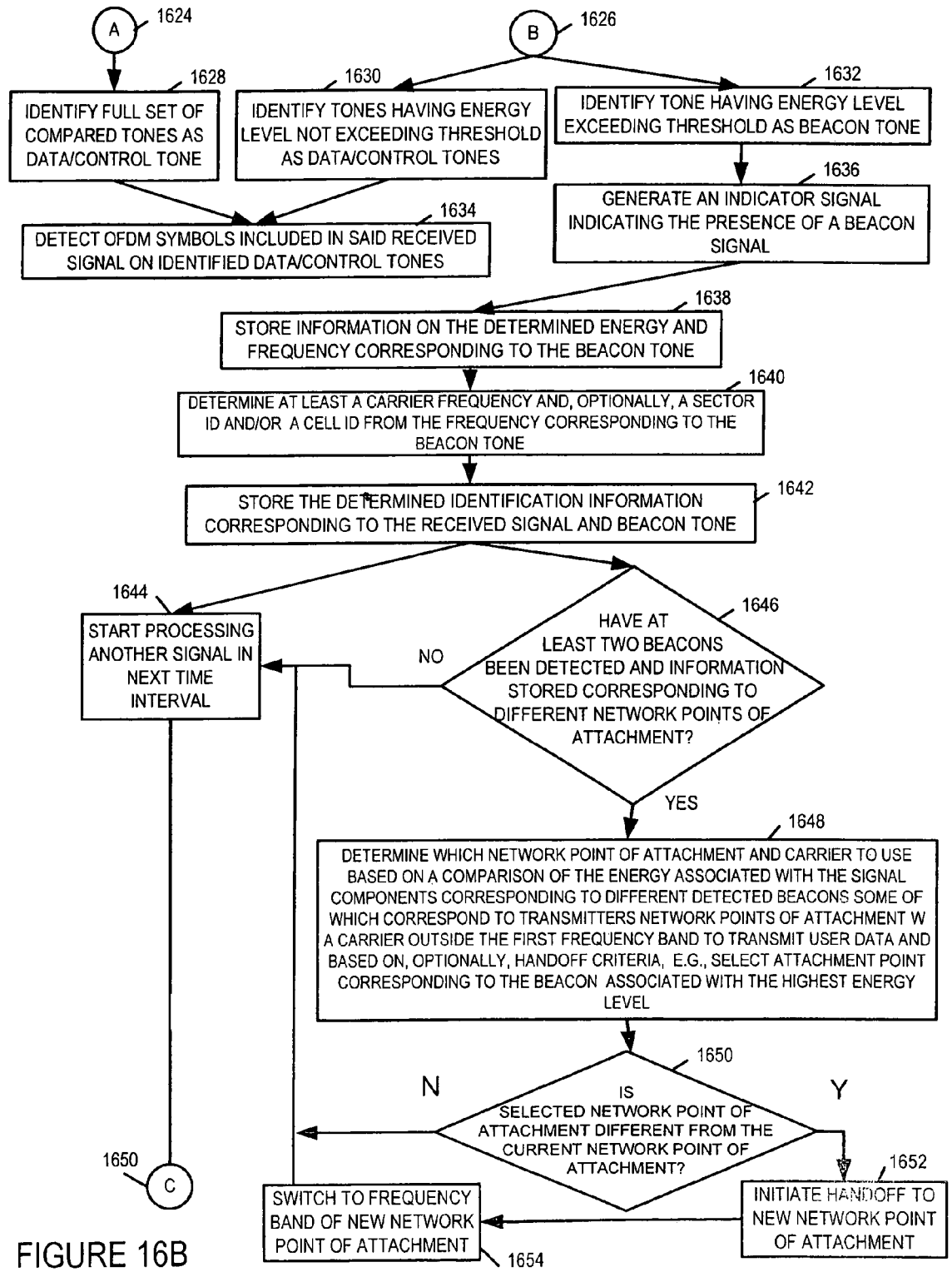

FIG. 16, comprising the combination of FIG. 16A and FIG. 16B, is a flowchart 1600 of an exemplary method of operating a wireless terminal (WT), e.g., a mobile node such as WT 300, that can be used in an exemplary orthogonal frequency division multiplexing (OFDM) communications system, in accordance with the present invention. Operation starts in step 1602 where the WT is powered on and initialized to receive downlink signals from base stations. Operation proceeds from step 1602 to step 1604. In step 1604, the WT is operated to receive a signal corresponding to a first frequency band that includes a plurality of tones in a first period of time. The signal includes a plurality of signal tones, which may or may not carry information, e.g., no power may have been transmitted on some of the tones. The signal tones may includes user data, control signals and/or beacon signals. The beacon signals may have been transmitted by a transmitter, e.g., a base station sector transmitter which the WT uses as a network point of attachment and receives user data from or from another transmitter, e.g., a transmitter corresponding to an adjacent sector, cell or another carrier frequency in the same sector from which the WT receives user data and which serves as the WT's current point of network attachment. Thus, while a beacon signal is received in the WT's current frequency band, it may actually correspond to a transmitter which uses a carrier frequency outside the current frequency band to transmit and receiver user data, e.g., text, audio, video, etc. said signal possibly including a beacon signal. In some embodiments, the first time period is a symbol transmission time period. Multiple symbols may be received on the different tones, e.g., one per tone, included in the signal received in step 1604. Operation proceeds from step 1604 to step 1606.

In step 1606, the WT is operated to perform a time to frequency conversion of said received signal to generate a set of signal components corresponding to different signal tones in the first frequency band. The output will normally include one signal component for each tone in the first frequency band that is used, at a point in time, to communicate a beacon signal component or a symbol conveying user data or control information. In some embodiments, the WT uses a Discrete Fourier Transform (DFT) in performing the time to frequency conversion, while in other embodiments, the WT uses a Fast Fourier Transform in performing the time to frequency conversion.

Then, in step 1608, the WT determines the energy of each of a plurality of different signal components which correspond to different frequencies within said first frequency band to generate a set of per signal tone energy values, each per signal tone energy value corresponding to a different tone. This can be done using any one of a plurality of well known signal energy measurement techniques. In cases where a beacon detection threshold is dynamically generated from one or more received signals, operation proceeds from step 1608 to step 1612 which is a threshold generation step. Operation also proceeds from step 1608 to step 1610 where processing of the received signal to detect the presence of beacon signals is performed.

Step 1612 is an optional step, used in various embodiments, that use a dynamically generated threshold for detection of beacon tones. In step 1612, the WT generates a threshold from at least one received signal. Step 1612 includes sub-steps 1614, 1616, 1618, and optionally, sub-step 1620. In sub-step 1614, the WT sums the total energy from the set of per signal tone energy values obtained in step 1608. For example, if the first frequency band included X tones, were X is over 100 in some but not necessarily all embodiments, the energy of the X tones is be summed together to generate an estimate of the total signal energy of the received signal. Next, in sub-step 1616, the WT divides the determined energy total of step 1614 by the number of tones, e.g., X, in the received signal, e.g., obtaining an average per tone energy value. Operation proceeds from sub-step 1616 to sub-step 1618, where the WT is operated to scale the result of step 1616 by a factor greater than 4, e.g., 5, 6, 10, 20, 100 or more times, depending on the implementation, to obtain a threshold value.

In some embodiments, operation proceeds from sub-step 1618 directly to step 1610 where the generated threshold is used. In other embodiments, operation proceeds from sub-step 1618 to sub-step 1620 where an averaging operation is performed. In sub-step 1620, the WT is operated to combine, e.g., average the threshold value of step 1618 with previously generated threshold values, obtaining a filtered threshold value. In some such embodiments, the dynamically generated threshold is generated from signals including at least one received signal which was received in an OFDM symbol transmission time period proceeding the first time period. The threshold value output from step 1618 or step 1620 is used in step 1610.

In one exemplary embodiment, in which step 1620 is skipped, the dynamically generated threshold is determined to be based on the received signal during the first time period, e.g., the same OFDM symbol transmission time period in which the beacon was detected and is not based on prior OFDM symbol transmission time periods.

In some embodiments, dynamic threshold generation step 1612, is omitted, and step 1610 uses a fixed threshold value, e.g., a stored value. In some embodiments, the stored fixed threshold value is one of a plurality of stored threshold values. In one such embodiment, the WT may start operations using the highest stored value from the set of stored threshold values for a predetermined amount of time, and if a beacon is not detected, then the selected stored value for the threshold values may be changed, e.g., lowered, in steps over time until a beacon is detected.

Returning to step 1610, in step 1610, the WT is operated to compare the determined energy of each of said plurality of different signal components to the beacon signal threshold energy level, which is determined in step 1612 or which is a preselected value. The beacon detection threshold is greater than the average per tone signal energy of said received signal. Operation proceeds from step 1610 to step 1622.

In step 1622, the WT determines whether any of the comparisons of step 1610 indicate that the threshold level has been exceeded indicating that a beacon signal component has been detected at the tone having the energy value exceeding the threshold. If the threshold level has been exceeded with regard to at least one signal component, operation proceeds from step 1622 to connecting node B 1626. However, if the threshold has not been exceeded operation proceeds to connecting node A 1624.

From connecting node B 1626, operation continues in steps 1630 and 1632. In step 1630 the WT is operated to identify tones having energy levels not exceeding the threshold as data/control tones, while in step 1632, the WT identifies tones, including at least the one tone, having an energy level exceeding the threshold, as a beacon tone. Operation proceeds from step 1630 to step 1634 where tones that do not exceed the beacon threshold are processed.

From connecting node A 1624, operation proceeds to step 1628, where the WT is operated to identify the full set of compared tones as data/control tones. Operation proceeds from step 1628 to step 1634.

In step 1634, the WT is operated to detect OFDM symbols, e.g., OFDM modulation symbols, included in said received signal on identified data/control tones. This normally involves the use of a clock signal which has been synchronized with the symbol timing of the base station which transmitted the data/control tones, e.g., a clock synchronized with the current point of network attachment. The data/control tones may convey user data originating from other WTs with which the receiving WT is having a communications session via the network point of attachment, power control channel information, timing control information, assignment information, and/or acknowledgement information.

Returning to step 1632, operation proceeds from step 1632 to step 1636, where the WT is operated to generate an indicator signal indicating the presence of a beacon signal or signals. Operation proceeds from step 1636 to step 1638. In step 1638, the WT is operated to store information on the determined energy and frequency corresponding to the identified beacon tone. In step 1640, the WT determines a carrier frequency corresponding to the detected beacon signal, e.g., based on the beacon signal's frequency. It may also determine a sector ID and a cell ID from the frequency corresponding to the beacon tone. Operation proceeds from step 1640 to step 1642. In step 1642, the WT stores the determined identification information corresponding to the received signal and identified beacon tone. Operation proceeds from step 1642 to step 1644 and step 1646. Since beacon signal detection and interpretation is based primarily on the frequency of the component or components, e.g., tones, of a received beacon and/or the interval at which beacon signals are received on particular frequencies, transmitter information can be obtained from the beacon signal without the WT having to having to achieve or maintain symbol timing synchronization with the transmitter of the beacon signals.

In step 1644, the WT is operated to start processing another signal in the next time interval, e.g., symbol transmission period. Operation proceeds from step 1644 via connecting node C 1650 to step 1604 for the reception and processing of the next received signal, e.g., during next OFDM symbol interval.

In step 1646, the WT is operated to check if at least two beacon signals have been detected and information stored corresponding to different transmitters, e.g., different cell, sector or transmitters within a sector which use different carrier frequencies. If beacons corresponding to different transmitters have been detected, then operation proceeds to step 1648, where the WT is operated to determine which base station sector to use as a network point of attachment based on a comparison of the energy associated with the signal components corresponding to different detected beacons. For example, in step 1648, the WT may select the attachment point corresponding to the beacon associated with the highest energy level. The selection may be subject to various handoff criteria to prevent frequent and/or unnecessary switching between carriers. For example, the power level of the beacon signal component or components associated with a particular point of attachment under consideration may be required to exceed the power level of the beacon signal associated with another network point of attachment for a predetermined time before a network point of attachment which is different from the current network point of attachment is selected.

Operation proceeds from step 1648 to step 1650 where the selected point of network attachment is compared to the current point of network attachment. If they are different, indicating the need for a handoff, operation proceeds to step 1652 wherein the WT initiates a handoff to the newly selected point of attachment. In some embodiments, this involves sending one or more signals via the current network point of attachment to the new network point of attachment and receiving, via the current point of attachment, one or more dedicated airlink resources.

Assuming the new network attachment point uses a different carrier frequency from the current network attachment, operation will proceeds from step 1652 to step 1554 wherein the WT switches its receiver and transmitter frequency band to that of the new network attachment point. Operation proceeds from step 1654 to step 1644. If the frequency band of the new network attachment point was the same as the old network attachment point, no change in the WT's frequency band is required and step 1654 is skipped with operation proceeding from step 1652 to step 1644.

Over time, based on received beacon signals, the selection of the network attachment point is repeatedly re-evaluated with the WT switching between network attachment points and carrier frequencies as signal conditions change, e.g., due to the WT changing location or due to other conditions.

In some but not necessarily all embodiments, beacon signal tones are transmitted with a per tone signal energy which is 10, 20, 30 or more times the average per tone signal energy of signal tones used to transmit user data and/or non-beacon control signals. In the case of a single tone beacon signal, the frequency of the beacon signal can be readily determined from the frequency of the single high power tone which makes up the beacon signal.

While selection between carriers has been described as being based on a comparison of the detected energy in beacon signals received from two different beacon transmitters, it can be appreciated that this comparison may involve averaging the power of beacon signals received from a transmitter over time to create an average received beacon power corresponding to a first transmitter and then another average received beacon power corresponding to a second transmitter. These two averages could then be compared to determine which beacon signal is stronger on average over a period of time and then selecting the carrier associated with the beacon signal that has been determined to be the stronger beacon signal over several time periods. Alternatively, the total beacon signal power could be accumulated over time and then compared for beacon signals received from different transmitters. In each of these cases, the selection of the carrier frequency would be based on a comparison of the energy received in one or more beacon signals from different transmitters.

While described primarily in the context of an OFDM system, the methods and apparatus of the present invention, are applicable to a wide range of communications systems including many non-OFDM and/or non-cellular systems.

In various embodiments nodes described herein are implemented using one or more modules to perform the steps corresponding to one or more methods of the present invention, for example, carrier band selection, digital signal processing, energy detection/SNR detection, decoding, timing synchronization, signal quality detection, etc. In some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the present invention described above will be apparent to those skilled in the art in view of the above description of the invention. Such variations are to be considered within the scope of the invention. The methods and apparatus of the present invention may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of the present invention.

What is claimed is:

1. A communications method for use in a wireless terminal in an OFDM communication system, the method comprising:
   receiving a first signal in a first frequency band, said first signal including a plurality of signal tones, each signal tone corresponding to a different frequency;
   performing a time to frequency conversion on said received signal to generate a set of signal components corresponding to different signal tones in the first frequency band;
   determining the energy of each of a plurality of different signal components which correspond to different signal tones within said first frequency band to generate a set of per signal tone energy values, each per signal tone energy value corresponding to a different frequency;
   detecting, from the per tone energy value of said signal components, a signal component corresponding to a beacon signal; and
   determining, based on the frequency of the signal component detected to correspond to a beacon signal, a carrier frequency corresponding to said beacon signal.

2. The communications method of claim 1,
   wherein said carrier frequency corresponding to said beacon signal is different from a current carrier frequency used to communicate with a current network point of attachment; and
   wherein said carrier frequency corresponding to said beacon signal is located in a second frequency band which is used, to transmit user data, by a network point of attachment which transmitted said detected beacon signal component, said detected beacon signal component being located outside said second frequency band.

3. The method of claim 1, further comprising:
   making a handoff decision as a function of the amount of energy included in at least one beacon signal component received from the current network point of attachment and the amount of energy included in the detected beacon signal component, said detected beacon signal component having been transmitted by a network point of attachment which is different from the current point of network attachment.

4. The method of claim 1, wherein detecting from the per tone signal energy value of said signal components a signal component correspond to a beacon signal includes:
   comparing the determined energy of each of said plurality of different signal components to a threshold energy level which is greater than the average per tone signal energy of said received signal.

5. The method of claim 4, wherein said threshold energy level is at least N times the average per tone signal energy of said received first signal in said first frequency band, where N is a positive value greater than 5.

6. The method of claim 4, wherein said threshold energy level is at least N times the average per tone signal energy of said received first signal in said first frequency band, where N is a positive value greater than 20.

7. The method of claim 4, wherein said threshold energy level is at least N times the average per tone signal energy of said received first signal in said first frequency band, where N is a positive value greater than 99.

8. The method of claim 4, wherein said threshold energy level is at least N times the average per tone signal energy of said received first signal in said first frequency band, where N is a positive value greater than 150.

9. The communications method of claim 4, wherein said step of performing a time to frequency conversion is performed using one of a discrete Fourier transform (DFT) and a fast Fourier transform (FFT).

10. The method of claim 6, further comprising:
    in response to detecting the presence of a signal component corresponding to a beacon signal determining at least one of a sector ID and a cell ID, based on the frequency of the signal component exceeding said threshold.

11. The method of claim 10, wherein said first received signal symbol is received during a first period of time which is a symbol transmission time period.

12. The method of claim 11, further comprising the step of:
    detecting OFDM symbols included in said first received signal on tones which do not have energy levels exceeding said threshold.

13. The method of claim 4, wherein said threshold is a dynamically generated threshold, the method further comprising:
    generating said threshold from at least one received signal.

14. The method of claim 13, wherein said at least one received signal includes a plurality of tones, the step of generating said threshold includes:
    determining the per tone energy of said at least one received signal.

15. The method of claim 14, where said per tone energy corresponds to the total energy of said at least one received signal divided by the number of different tones included in said at least one received signal, each tone corresponding to a different frequency.

16. The method of claim 13, wherein said at least one received signal is a signal received in an OFDM symbol transmission time period preceding said first time period in which said first signal is received.

17. The method of claim 13, wherein said at least one received signal is said first received signal.

18. The method of claim 4, further comprising:
    storing information on the determined energy and frequency of a first signal component in said received signal which was determined to have a signal component energy level exceeding said threshold energy level.

19. The method of claim 18, wherein said first signal component is received from a base station sector transmitter corresponding to a base station sector in which said wireless terminal performing said receiving step is located.

20. The method of claim 18, wherein said first signal is received in a first period of time, the method further comprising:
    receiving a second signal in a second period of time, said second signal including a plurality of signal tones, each signal tone in said second signal corresponding to a different frequency;
    performing a time to frequency conversion on said received second signal to generate a second set of signal components corresponding to different signal tones in the first frequency band;
    determining the energy of each of a plurality of different signal components in said second set of signal components to generate a second set of per signal tone energy values, each per signal tone energy value in said second set of per signal tone energy values corresponding to a different frequency;

comparing the determined energy of each of said plurality of different signal components to said threshold energy level; and generating a second indicator signal indicating the presence of a second beacon signal when said comparing step determines that said threshold energy level is exceeded.

21. The method of claim 19, further comprising:
determining which base station sector to use as a network point of attachment based on a comparison of the determined energy of the first signal component and the determined energy of the signal component in said second signal determined have an energy level exceeding said threshold energy level.

22. The method of claim 1, wherein the current network attachment point is a first sector of a cell and wherein said detected beacon signal is transmitted by a different sector of said cell.

23. The method of claim 1, wherein the current network attachment point is a first sector of a cell and wherein said detected beacon signal is transmitted by a different sector of a different cell.

24. The method of claim 1, wherein the current network attachment point is a first module corresponding to a first carrier used in a first sector of a cell and wherein said detected beacon signal is transmitted by a second module corresponding to a second carrier used in said first sector of said cell, said second module serving as a second network attachment point in said first sector of said cell.

25. A wireless terminal for use in a communication system, the wireless terminal comprising:
means for receiving a signal in a first period of time, said signal including a plurality of signal tones, each signal tone corresponding to a different frequency;
means for performing a time to frequency conversion on said received signal to generate a set of signal components corresponding to different signal tones in a first frequency band;
means for determining the energy of each of a plurality of different signal components which correspond to different frequencies within said first frequency band to generate a set of per signal tone energy values, each per signal tone energy value corresponding to a different frequency;
means for comparing the determined energy of each of said plurality of different signal components to a threshold energy level which is greater than the average per signal tone energy of said received signal to detect a signal component corresponding to a beacon signal; and
means for determining if a handoff should be initiated to a network attachment point which transmitted a detected beacon signal and which uses a carrier frequency to transmit user data that is different from a carrier frequency in use by said wireless terminal to communicate with a current point of network attachment.

26. The wireless terminal of claim 25, wherein said threshold energy level is at least N times the average per signal tone energy of said received signal in said first frequency band, where N is a positive value greater than 5.

27. The wireless terminal of claim 25, wherein said threshold energy level is at least N times the average signal energy of said received signal in said first frequency band, where N is a positive value greater than 150.

28. The wireless terminal of claim 25, wherein said means for performing a time to frequency conversion is performed using one of a discrete Fourier transform (DFT) and a fast Fourier transform (FFT).

29. The wireless terminal of claim 28, further comprising:
means for determining at least one of a sector ID and a cell ID based on the frequency of the signal component exceeding said threshold.

30. The wireless terminal of claim 29, wherein said first period of time is an OFDM symbol transmission time period.

31. The wireless terminal of claim 30, further comprising:
a symbol detection module for detecting symbols included in said received signal on tones which do not have energy levels exceeding said threshold.

32. The wireless terminal of claim 25, wherein said threshold is a dynamically generated threshold, the wireless terminal comprising:
a threshold generation module coupled to said means for performing a time to frequency conversion.

33. The wireless terminal of claim 25, further comprising:
means for storing information on the determined energy and frequency of a first signal component received during said first period of time which was determined to have a signal component energy level exceeding said threshold energy level.

34. The wireless terminal of claim 33, wherein said first signal component is received from a base station sector transmitter corresponding to a base station sector in which said wireless terminal performing said receiving step is located.

35. The wireless terminal of claim 33, wherein the majority of the energy included in said first signal component is received from a base station sector corresponding to a base station sector located adjacent the base station sector in which the wireless terminal receiving the first signal component is located.

36. The wireless terminal of claim 33, further comprising:
means for receiving a second signal in a second period of time, said second signal including a plurality of signal tones, each signal tone in said second signal corresponding to a different frequency;
means for performing a time to frequency conversion on said received second signal to generate a second set of signal components corresponding to different signal tones in the first frequency band;
means for determining the energy of each of a plurality of different signal components in said second set of signal components to generate a second set of per signal tone energy values, each per signal tone energy value in said second set of per signal tone energy values corresponding to a different frequency;
means for comparing the determined energy of each of said plurality of different signal components to said threshold energy level; and
means for determining if a handoff should be initiated.

37. The wireless terminal of claim 34, further comprising:
means for determining which base station sector to use as a network point of attachment based on a comparison of the determined energy of the first signal component and the determined energy of the signal component in said second signal determined have an energy level exceeding said threshold energy level.

38. A computer readable medium embodying computer executable instructions for controlling a wireless terminal, the computer readable medium comprising:
instructions for causing the wireless terminal to receive a first signal in a first frequency band, said first signal including a plurality of signal tones, each signal tone corresponding to a different frequency;

instructions for causing the wireless terminal to perform a time to frequency conversion on said received signal to generate a set of signal components corresponding to different signal tones in the first frequency band;

instructions for causing the wireless terminal to determine the energy of each of a plurality of different signal components which correspond to different signal tones within said first frequency band to generate a set of per signal tone energy values, each per signal tone energy value corresponding to a different frequency;

instructions for causing the wireless terminal to detect, from the per tone energy value of said signal components, a signal component corresponding to a beacon signal; and instructions for causing the wireless terminal to determine, based on the frequency of the signal component detected to correspond to a beacon signal, a carrier frequency corresponding to said beacon signal.

39. The computer readable medium of claim 38, wherein said carrier frequency corresponding to said beacon signal is different from a current carrier frequency used to communicate with a current network point of attachment; and wherein said carrier frequency corresponding to said beacon signal is located in a second frequency band which is used to transmit user data, by a network point of attachment which transmitted said detected beacon signal component, said detected beacon signal component being located outside said second frequency band.

40. The computer readable medium of claim 38, farther comprising:

instructions for causing the wireless terminal to make a handoff decision as a function of the amount of energy included in at least one beacon signal component received from the current network point of attachment and the amount of energy included in the detected beacon signal component, said detected beacon signal component having been transmitted by a network point of attachment which is different from the current point of network attachment.

41. The computer readable medium of claim 38, farther comprising:

instructions for causing the wireless terminal, as part of detecting a signal component corresponding to a beacon signal, to:

compare the determined energy of each of said plurality of different signal components to a threshold energy level which is greater than the average per tone signal energy of said received signal.

42. A wireless terminal for use in a communication system, the wireless terminal comprising:

a receiver for receiving a signal in a first period of time, said signal including a plurality of signal tones, each signal tone corresponding to a different frequency;

a digital signal processing module for performing a time to frequency conversion on said received signal to generate a set of signal components corresponding to different signal tones in a first frequency band;

a signal quality detection module for determining the energy of each of a plurality of different signal components which correspond to different frequencies within said first frequency band to generate a set of per signal tone energy values, each per signal tone energy value corresponding to a different frequency;

a receiver controller module for comparing the determined energy of each of said plurality of different signal components to a threshold energy level which is greater than the average per signal tone energy of said received signal to detect a signal component corresponding to a beacon signal; and a carrier band selection module for determining if a handoff should be initiated to a network attachment point which transmitted a detected beacon signal and which uses a carrier frequency to transmit user data that is different from a carrier frequency in use by said wireless terminal to communicate with a current point of network attachment.

43. The wireless terminal of claim 42, wherein said digital signal processing module uses one of a discrete Fourier transform (DFT) and a fast Fourier transform (FFT).

44. The wireless terminal of claim 43, further comprising:

a transmitter information determination module for determining at least one of a sector ID and a cell ID based on the frequency of the signal component exceeding said threshold.

45. The wireless terminal of claim 42, further comprising:

a transmitter information determination module for storing information on the determined energy and frequency of a first signal component received during said first period of time which was determined to have a signal component energy level exceeding said threshold energy level.

\* \* \* \* \*